(12) United States Patent
Frye et al.

(10) Patent No.: US 9,925,892 B2
(45) Date of Patent: Mar. 27, 2018

(54) ADJUSTABLE VEHICLE SEAT

(71) Applicant: Faurecia Automotive Seating, LLC, Auburn Hills, MI (US)

(72) Inventors: Dale J Frye, West Olive, MI (US); Jeffery T Bonk, Chesterfield, MI (US); Christopher L Hogg, Holland, MI (US); Adam M Deck, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/080,908

(22) Filed: Mar. 25, 2016

(65) Prior Publication Data

US 2016/0280098 A1 Sep. 29, 2016

Related U.S. Application Data

(60) Provisional application No. 62/138,476, filed on Mar. 26, 2015.

(51) Int. Cl.
| | |
|---|---|
| *B60N 2/02* | (2006.01) |
| *B60N 2/08* | (2006.01) |
| *B60N 2/12* | (2006.01) |
| *B60N 2/16* | (2006.01) |

(52) U.S. Cl.
CPC ......... *B60N 2/0252* (2013.01); *B60N 2/0228* (2013.01); *B60N 2/0248* (2013.01); *B60N 2/08* (2013.01); *B60N 2/0818* (2013.01); *B60N 2/0881* (2013.01); *B60N 2/123* (2013.01); *B60N 2/1615* (2013.01); *B60N 2002/0272* (2013.01)

(58) Field of Classification Search
None
See application file for complete search history.

(56) References Cited

U.S. PATENT DOCUMENTS

| | | | | |
|---|---|---|---|---|
| 5,254,924 A | * | 10/1993 | Ogasawara | B60N 2/0252 318/467 |
| 7,667,345 B2 | | 2/2010 | Budweg et al. | |
| 2006/0217864 A1 | * | 9/2006 | Johnson | B60N 2/002 701/45 |
| 2008/0189053 A1 | * | 8/2008 | Breed | G01S 7/417 702/41 |
| 2009/0088930 A1 | * | 4/2009 | Ohtsubo | B60N 2/0252 701/49 |
| 2013/0200668 A1 | * | 8/2013 | Michalak | B60N 2/0232 297/217.1 |
| 2013/0253779 A1 | * | 9/2013 | Fujii | B60N 2/0248 701/49 |
| 2014/0265479 A1 | * | 9/2014 | Bennett | B60N 2/502 297/217.4 |
| 2015/0001366 A1 | * | 1/2015 | Nakashima | B60N 2/0722 248/429 |

\* cited by examiner

*Primary Examiner* — Rodney Butler
*Assistant Examiner* — Tamara Weber
(74) *Attorney, Agent, or Firm* — Barnes & Thornburg LLP

(57) ABSTRACT

A vehicle seat includes a seat bottom and a seat back coupled to the seat bottom to extend upwardly away from the seat bottom. The vehicle seat further includes a seat-bottom foundation arranged to interconnect the seat bottom and seat back to translate back and forth relative to a vehicle floor.

19 Claims, 30 Drawing Sheets

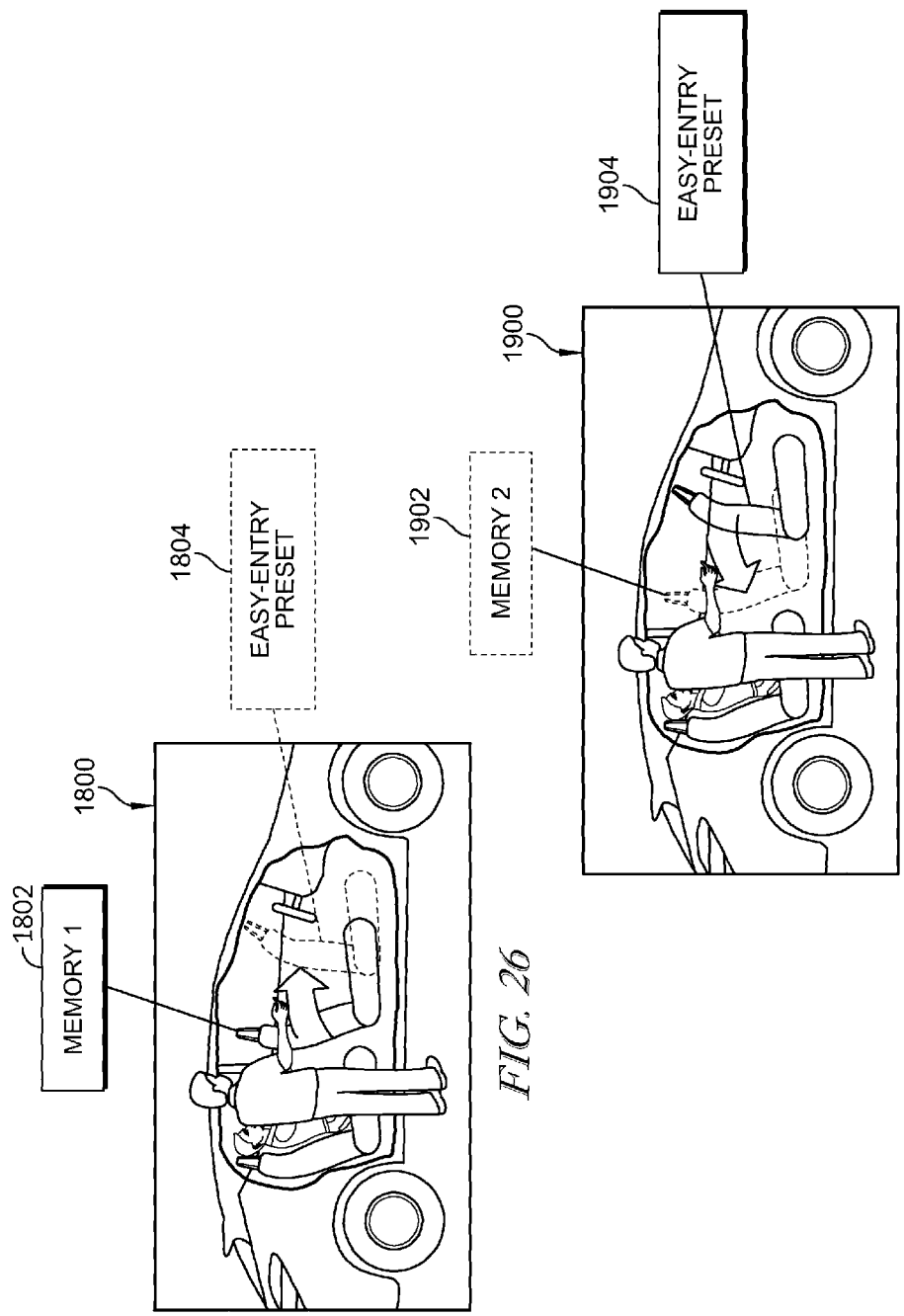

ADJUSTABLE VEHICLE SEAT

PRIORITY CLAIM

This application claims priority under 35 U.S.C. § 119(e) to U.S. Provisional Application Ser. No. 62/138,476, filed Mar. 26, 2015, which is expressly incorporated by reference herein.

BACKGROUND

The present disclosure relates to a vehicle seat, and particularly to a vehicle seat movable relative to a floor of a vehicle. More particularly, the present disclosure relates to a vehicle seat including electronic components.

SUMMARY

According to the present disclosure, a vehicle seat includes a seat bottom and a seat back coupled to the seat bottom to extend upwardly away from the seat bottom. The vehicle seat further includes a seat-bottom foundation arranged to interconnect the seat bottom and seat back to translate back and forth relative to a vehicle floor.

In illustrative embodiments, the vehicle seat further includes a smart-height system. The smart-height system is configured to provide means for moving the vehicle seat to a predetermined vertical position relative to the floor based on the longitudinal position of the vehicle seat relative to the floor of the vehicle so that comfort and safety of a passenger sitting on the vehicle seat are maximized.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a vehicle seat in accordance with the present disclosure showing that the vehicle seat includes a smart-height system configured to provide a predetermined vertical position of the vehicle seat relative to the vehicle floor associated with each longitudinal location of the vehicle seat, a manual memory system configured to provide a multitude of adjustments of a longitudinal position of the vehicle seat relative to a vehicle floor and storage of those longitudinal positions for recall at a later time, and an easy-entry system configured to move the vehicle seat between a predetermined entry arrangement and one of the previously stored positions;

Figure 1:
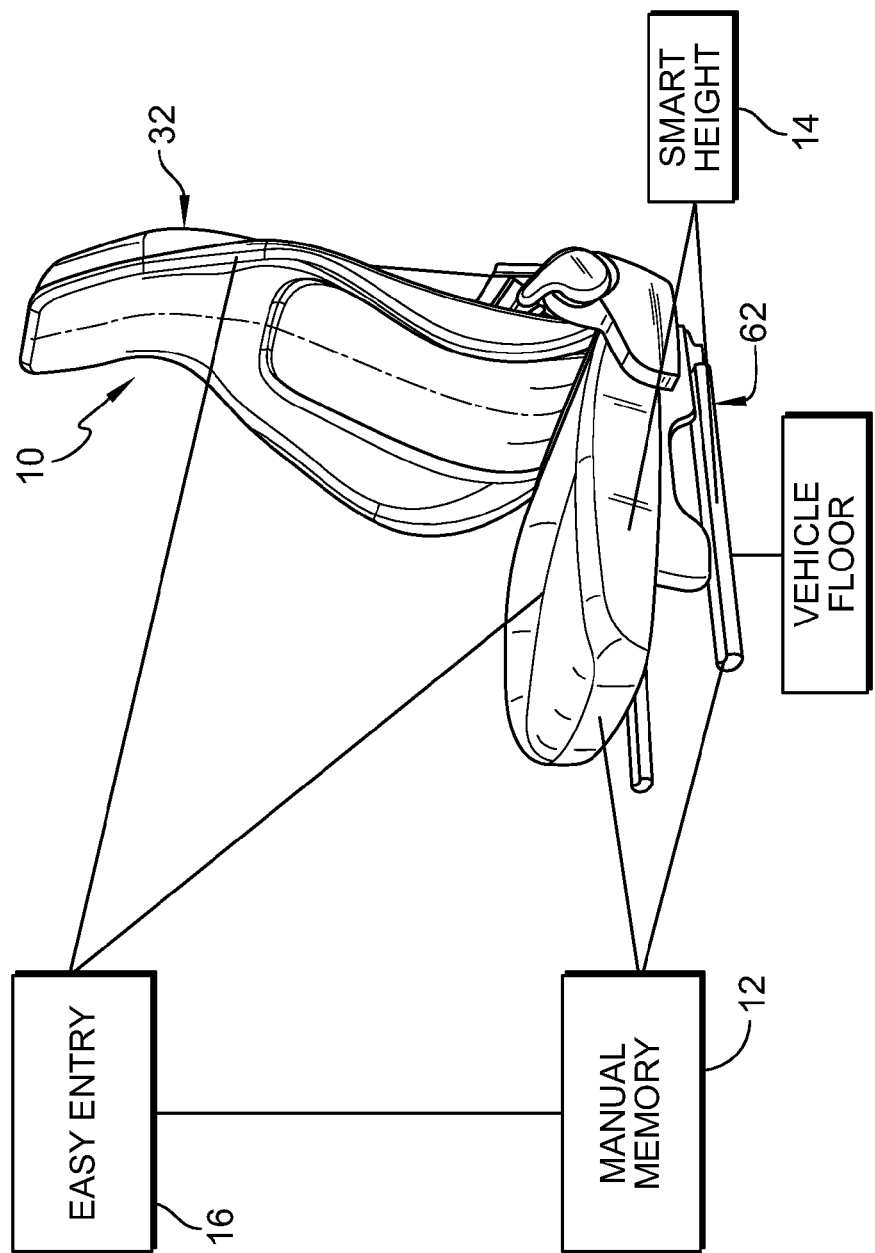
FIG. 1A shows a side view of a vehicle seat that may be configured to be positioned in a plurality of ways via the manual memory system via use of electric motors to provide force to the vehicle seat.
Figure 3:
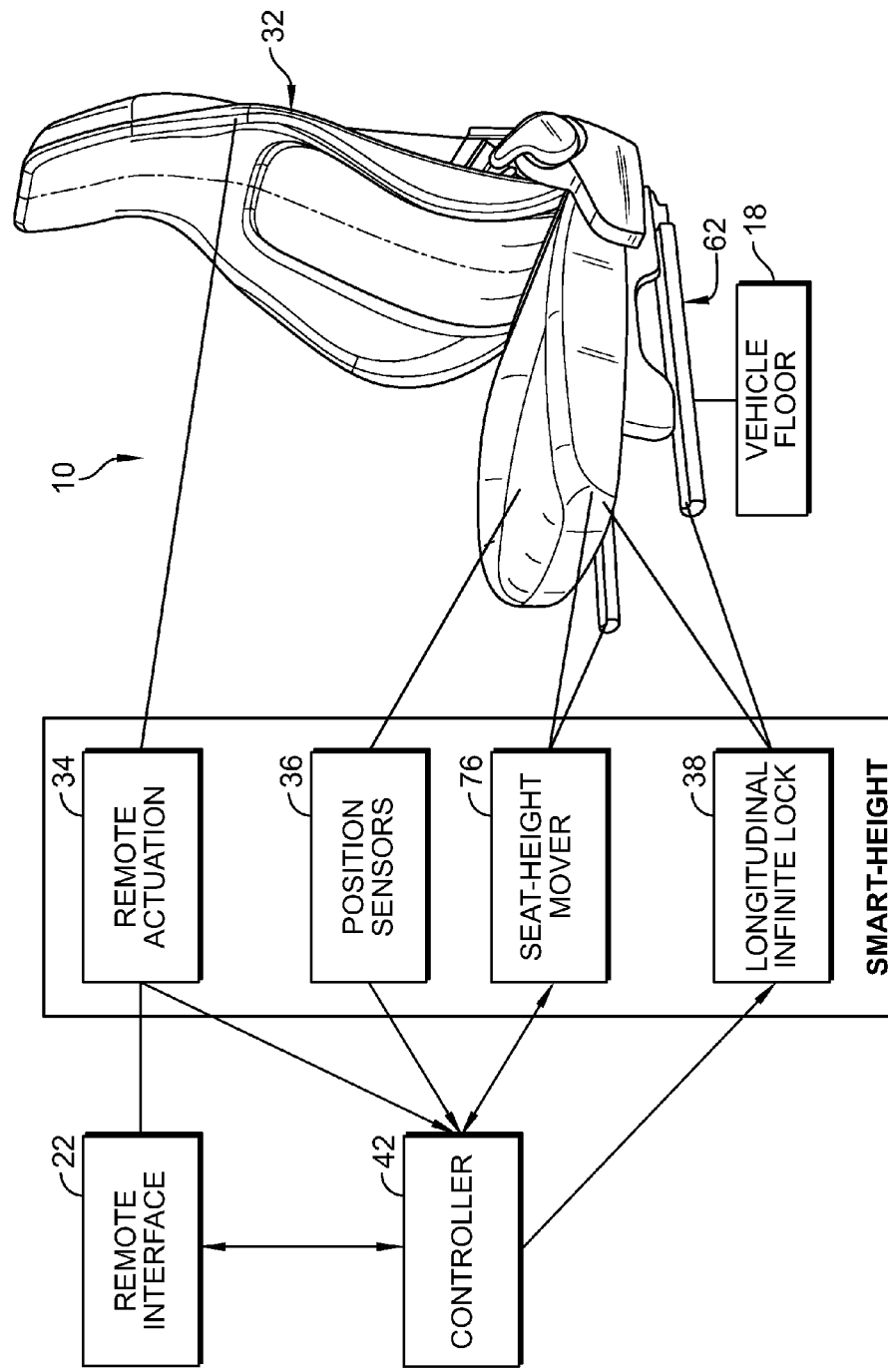
Figure 4:
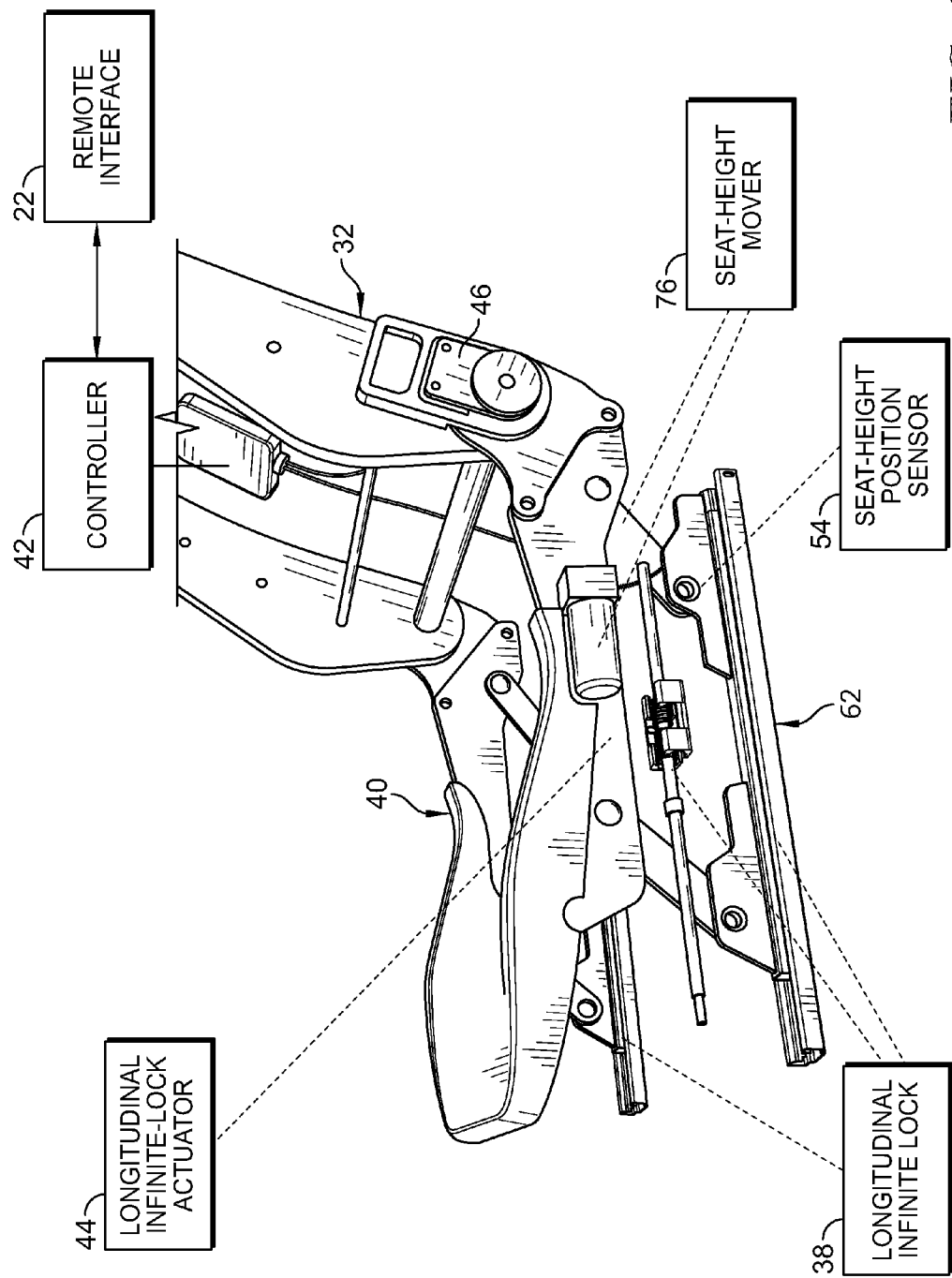
Figure 5:
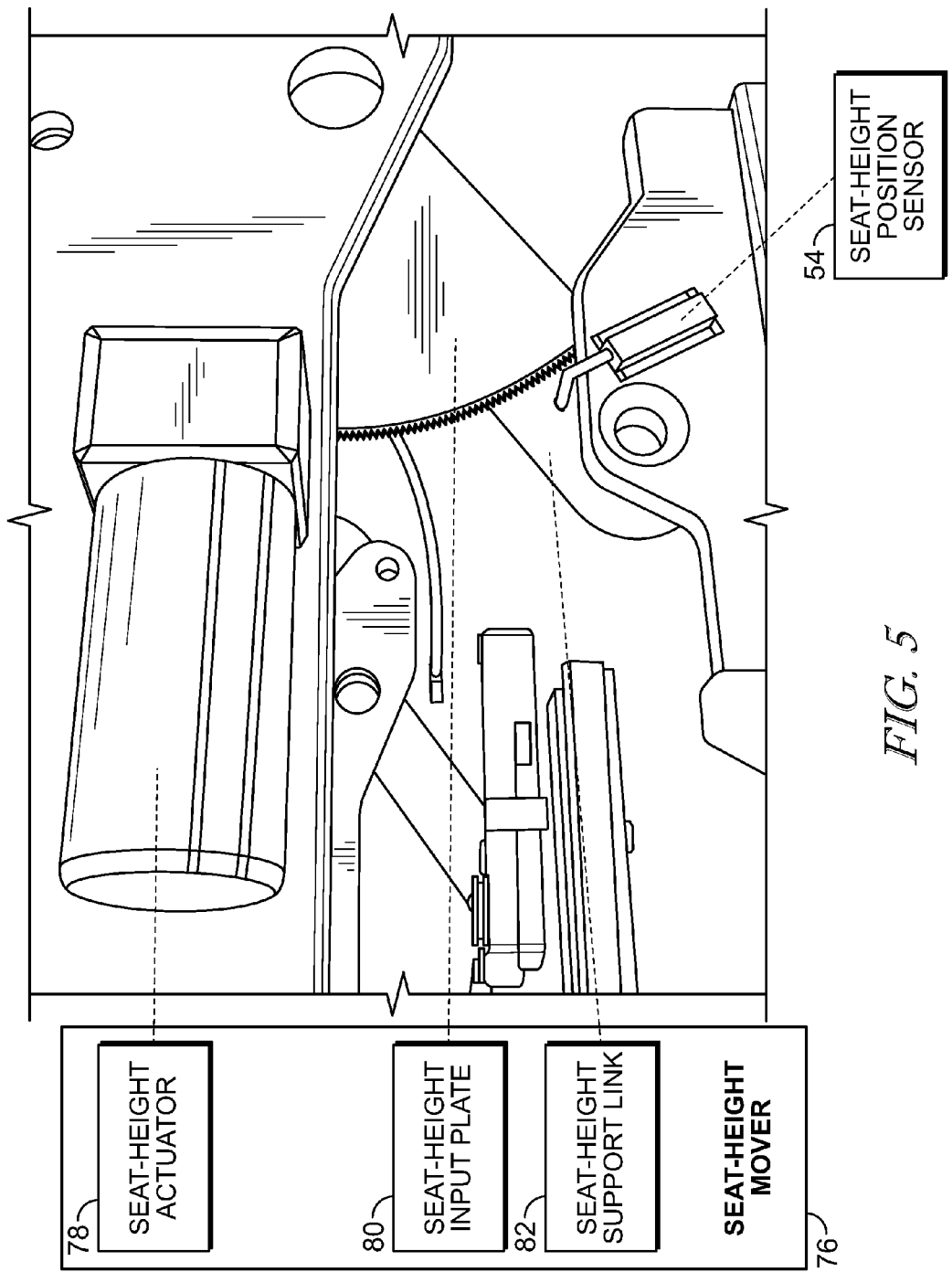
Figure 6:
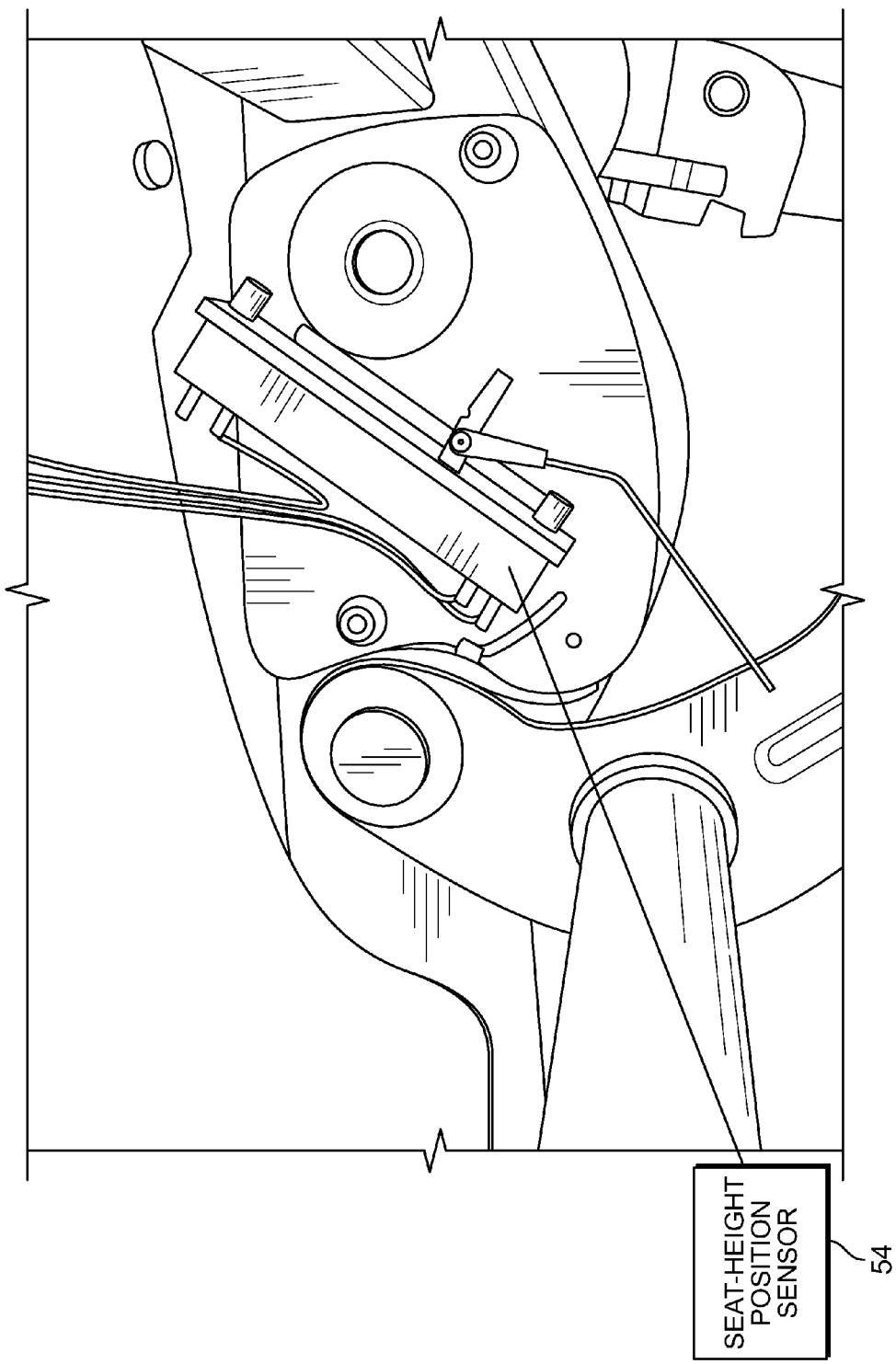
Figure 7:
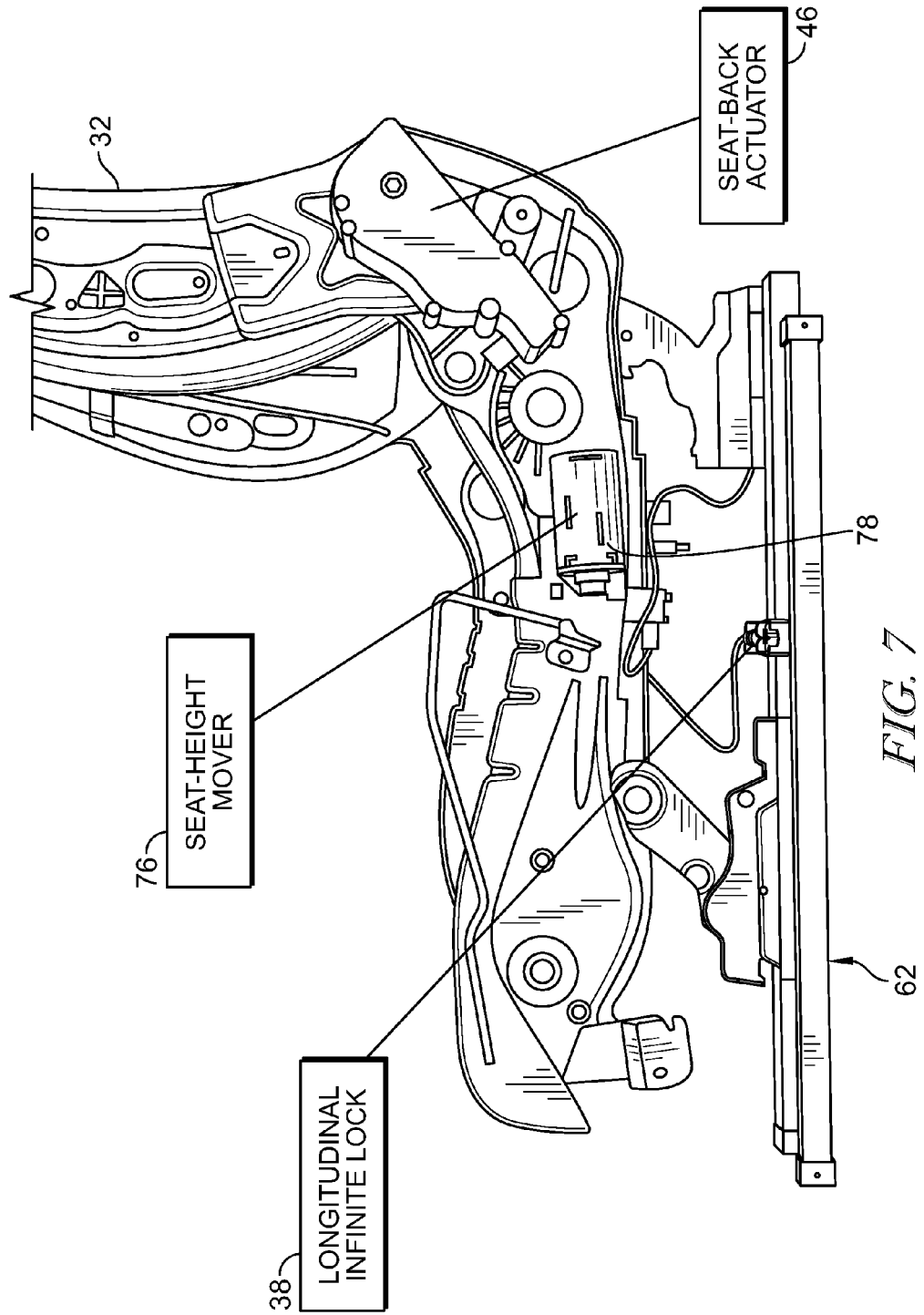
Figure 8:
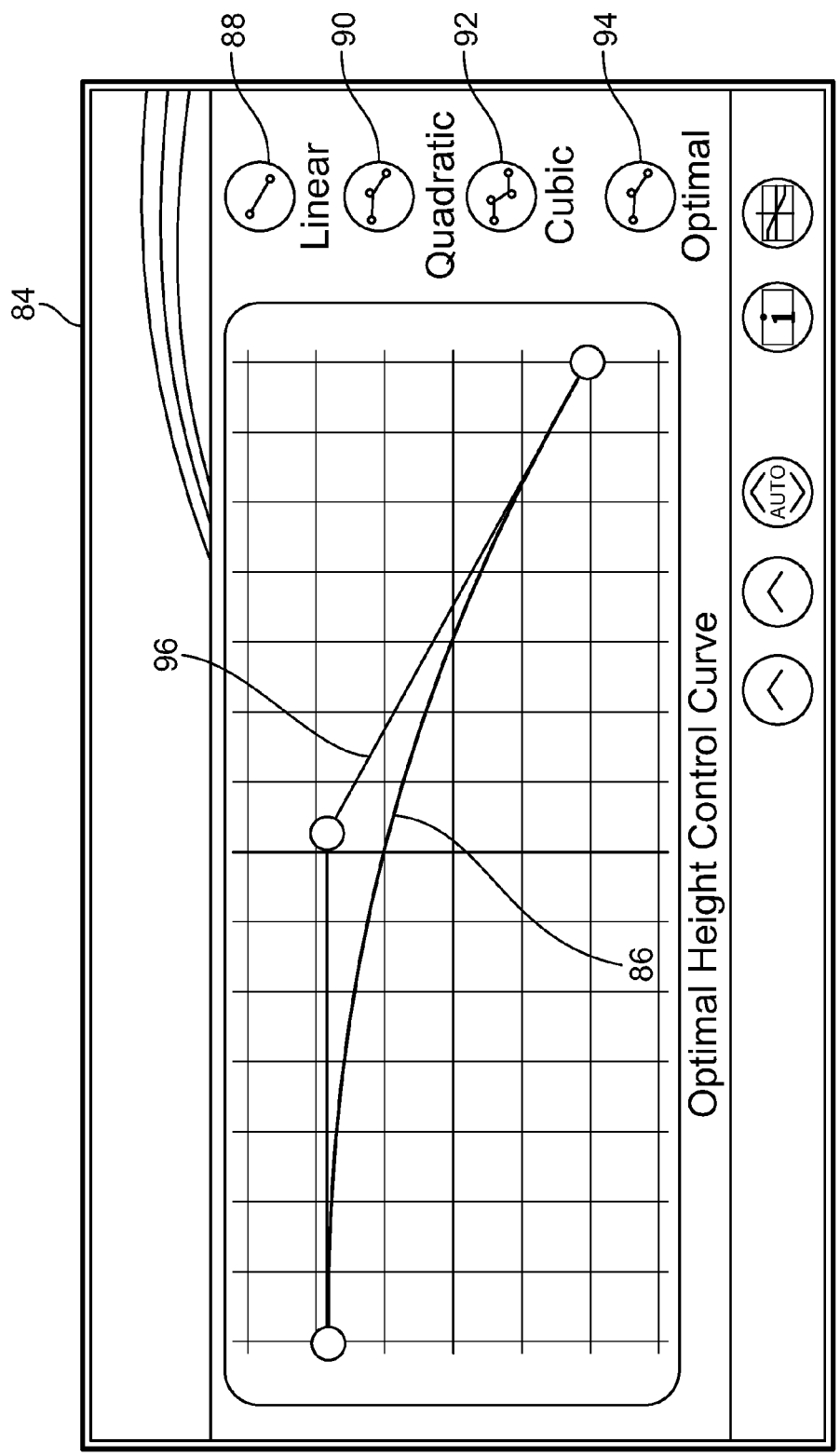
Figure 9:
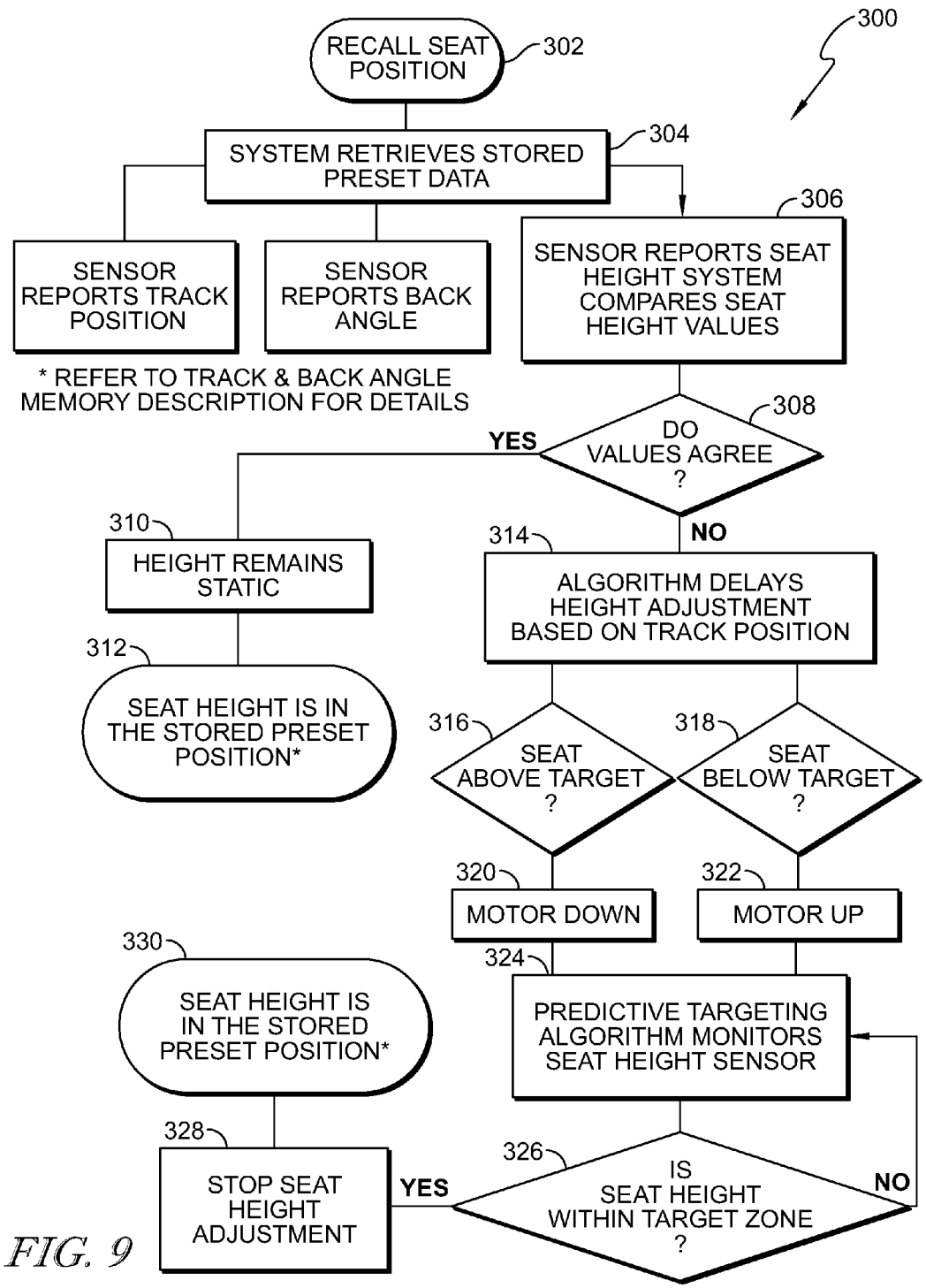
Figure 10:
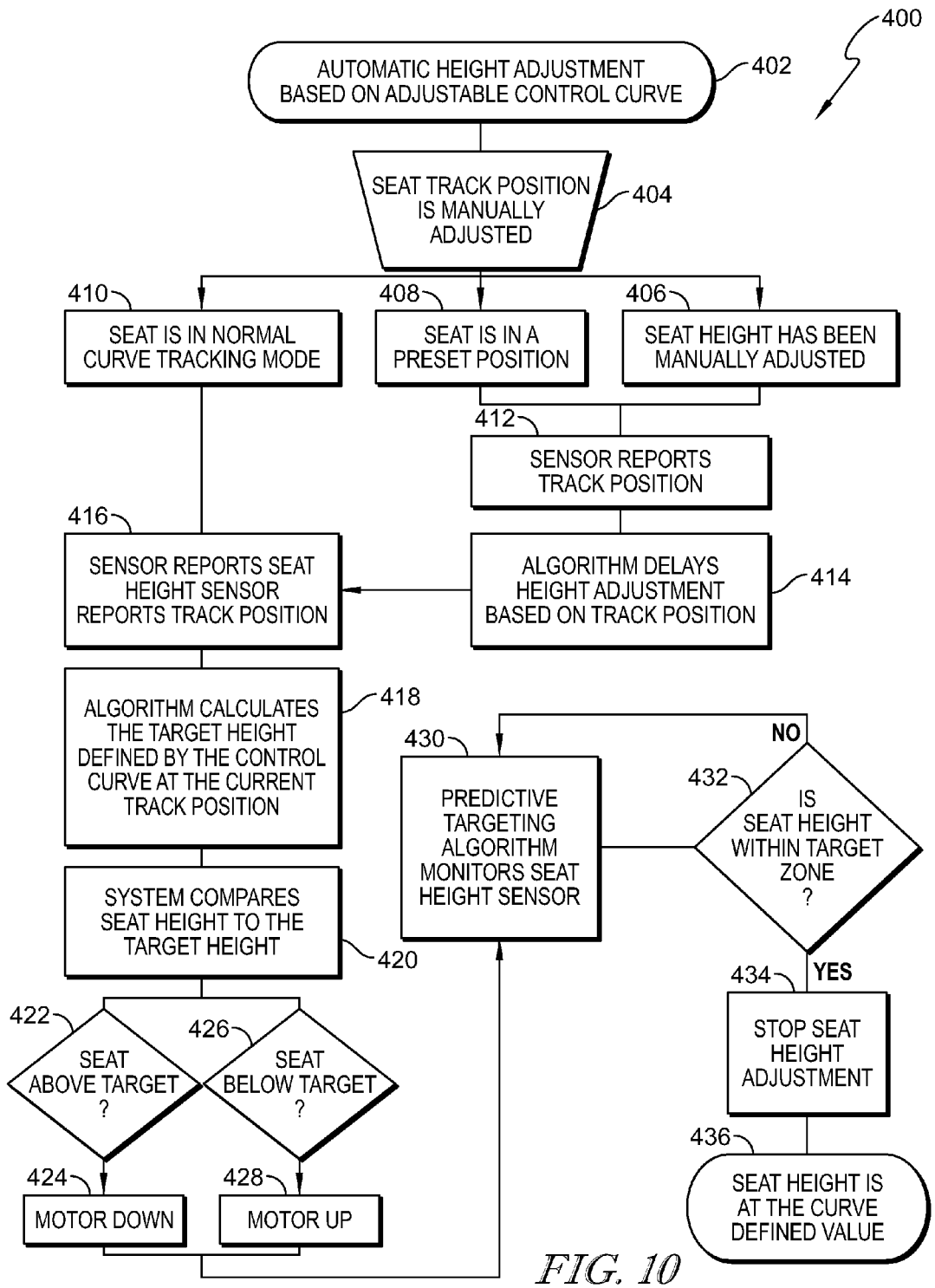
Figure 11:
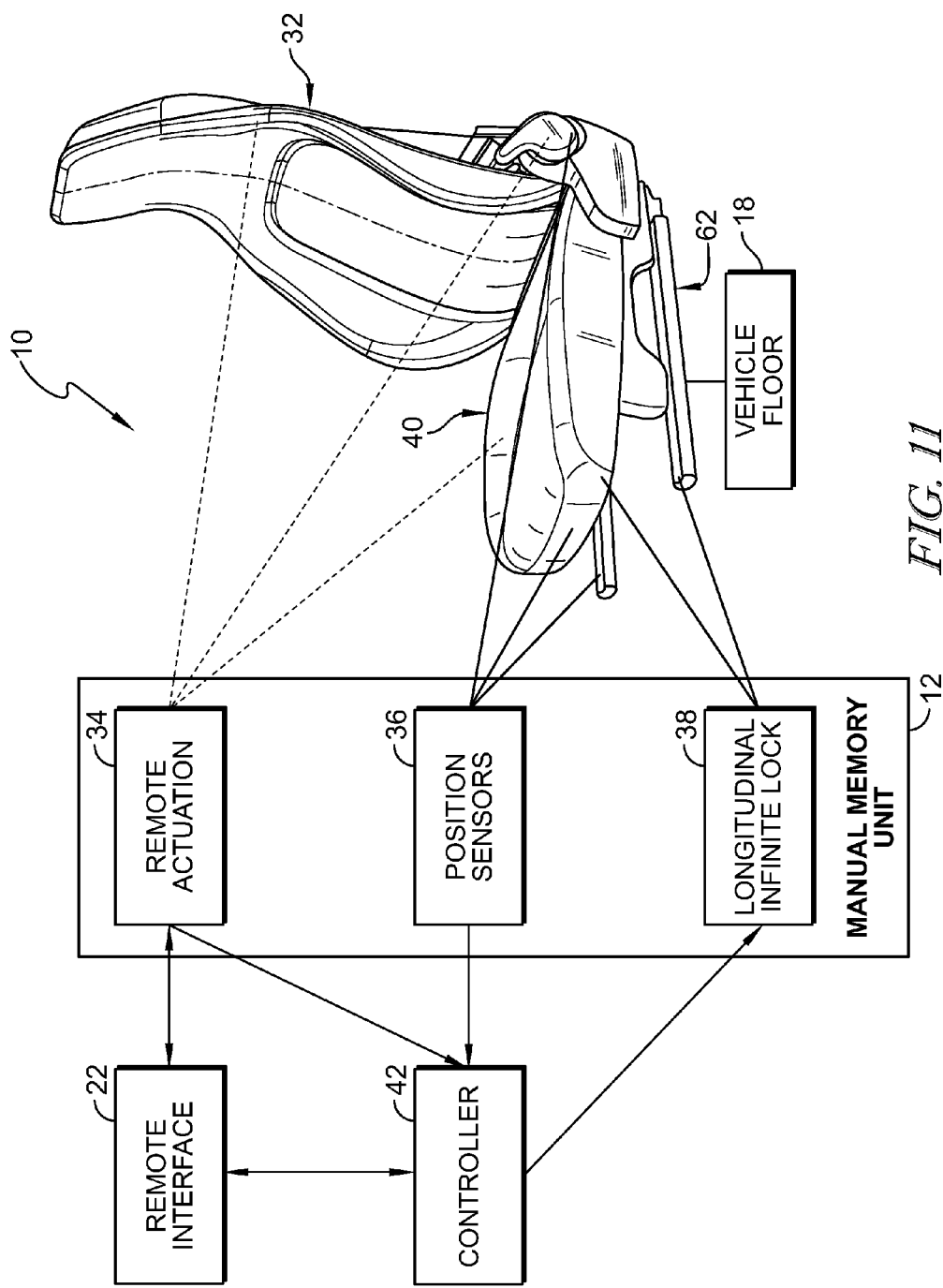
Figure 12:
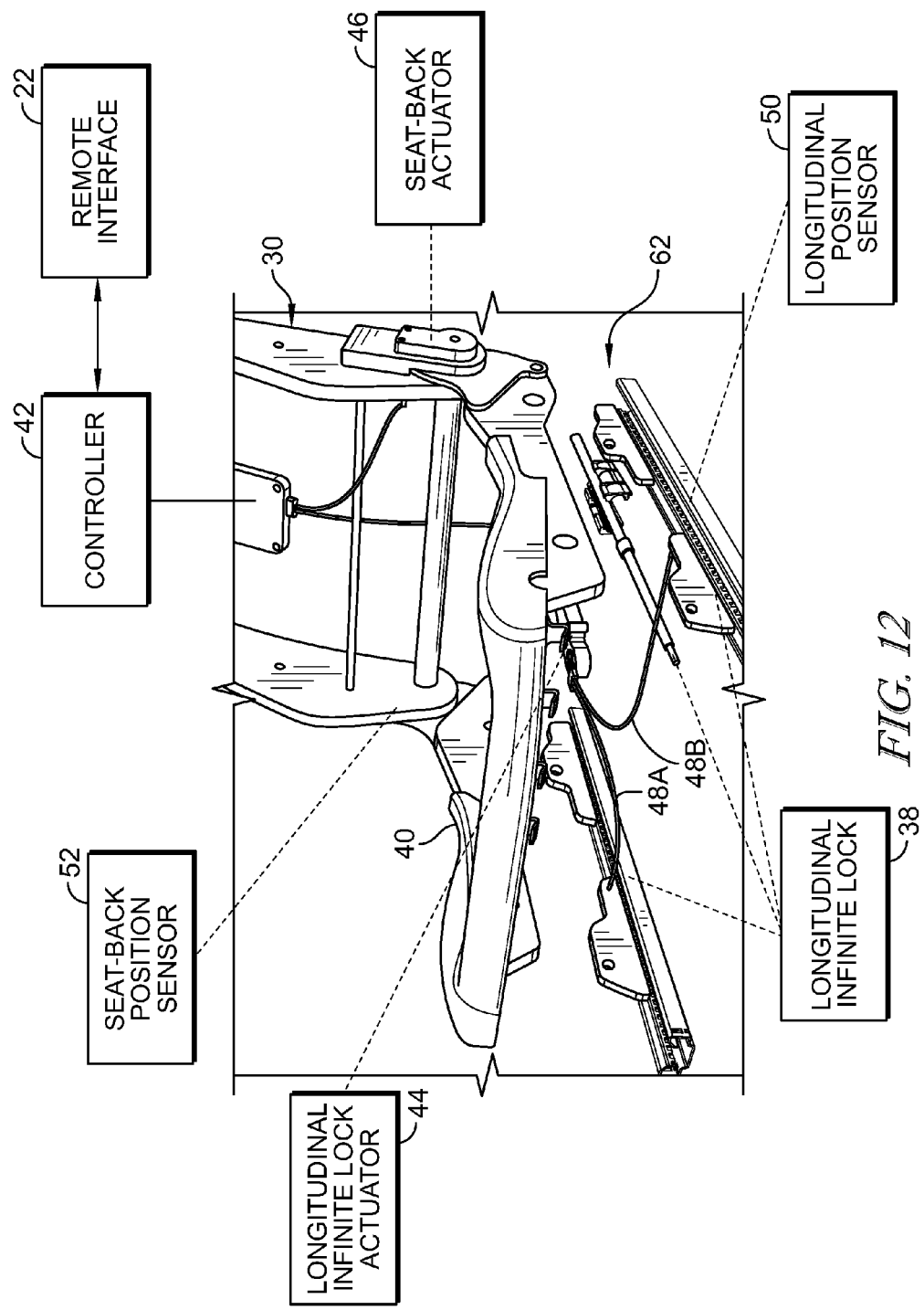
Figure 13:
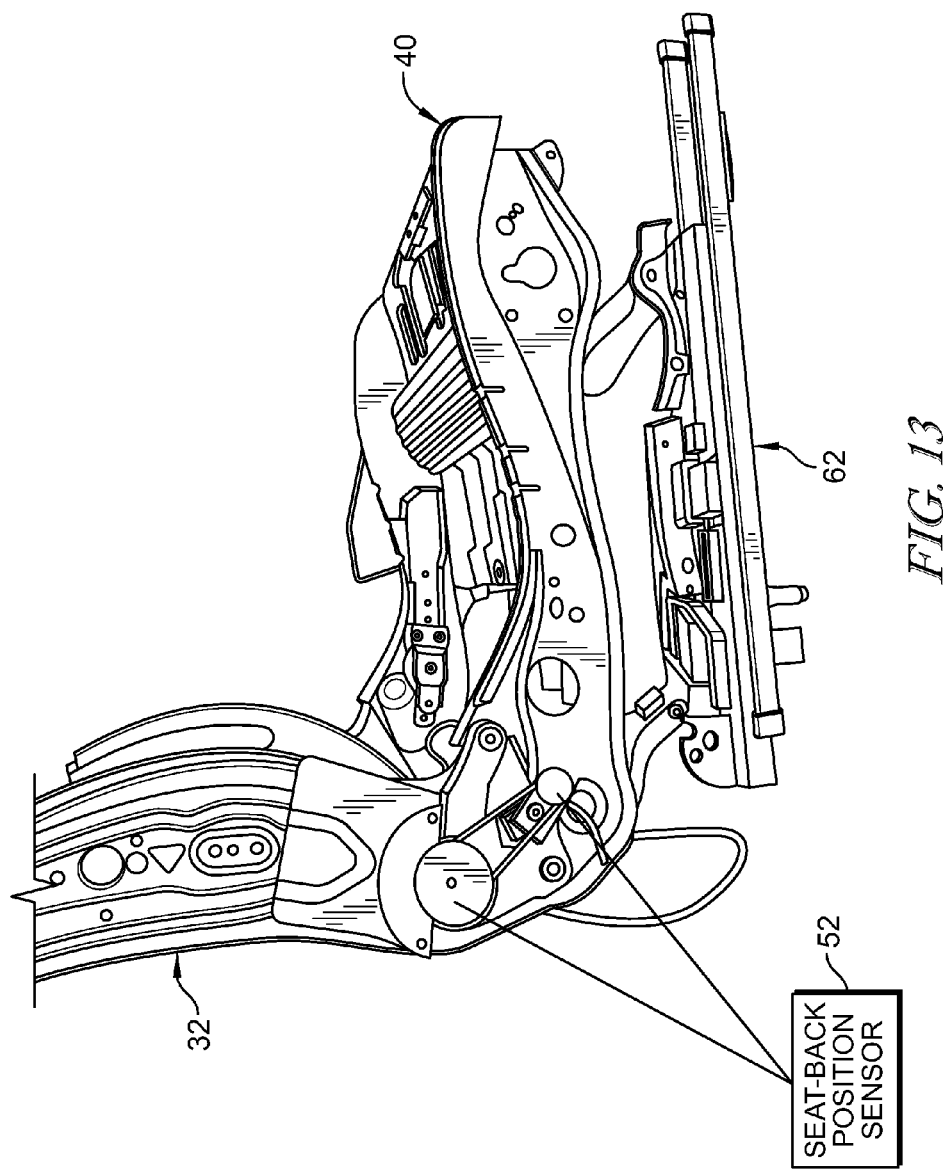
Figure 14:
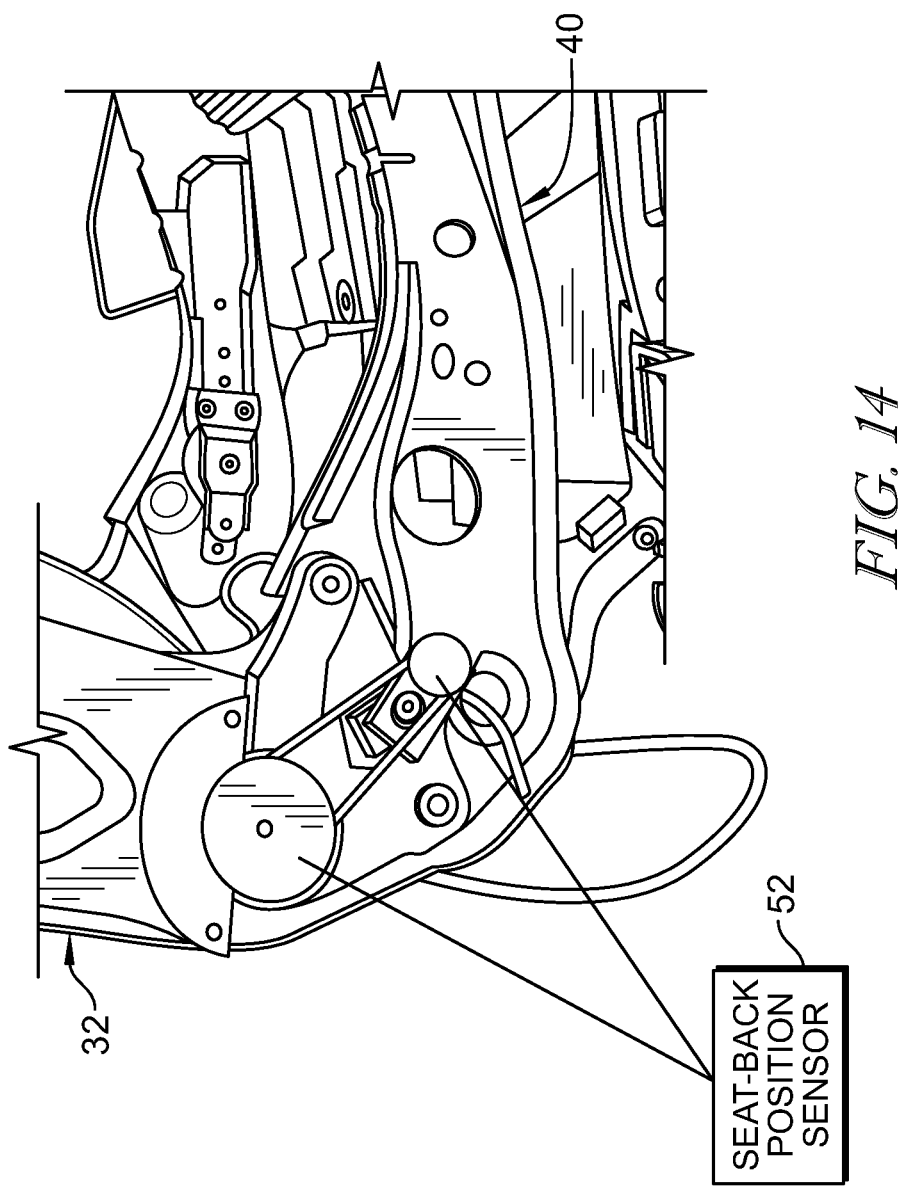
Figure 15:
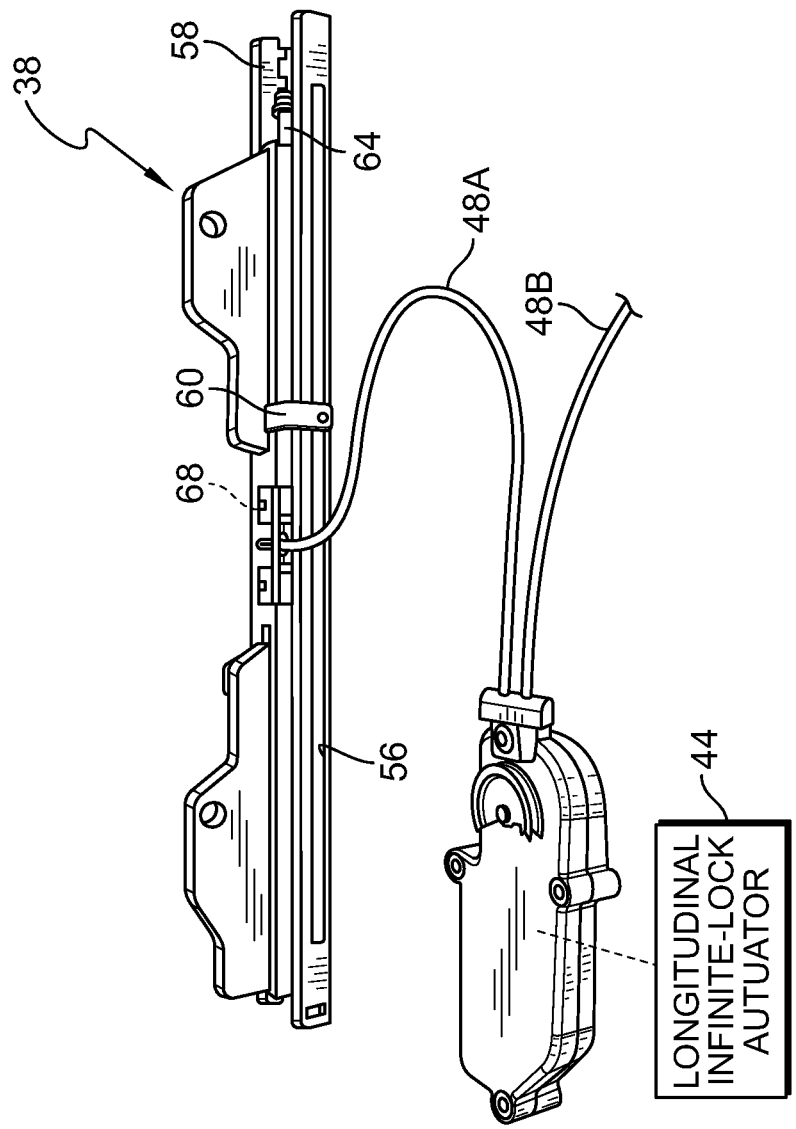
Figure 16:
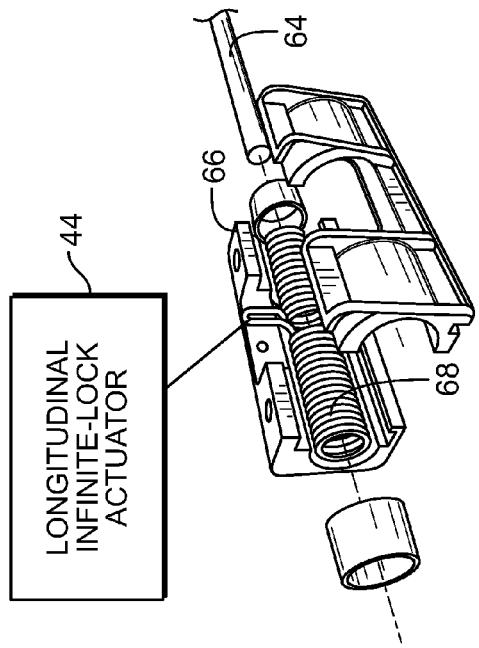
Figure 17:
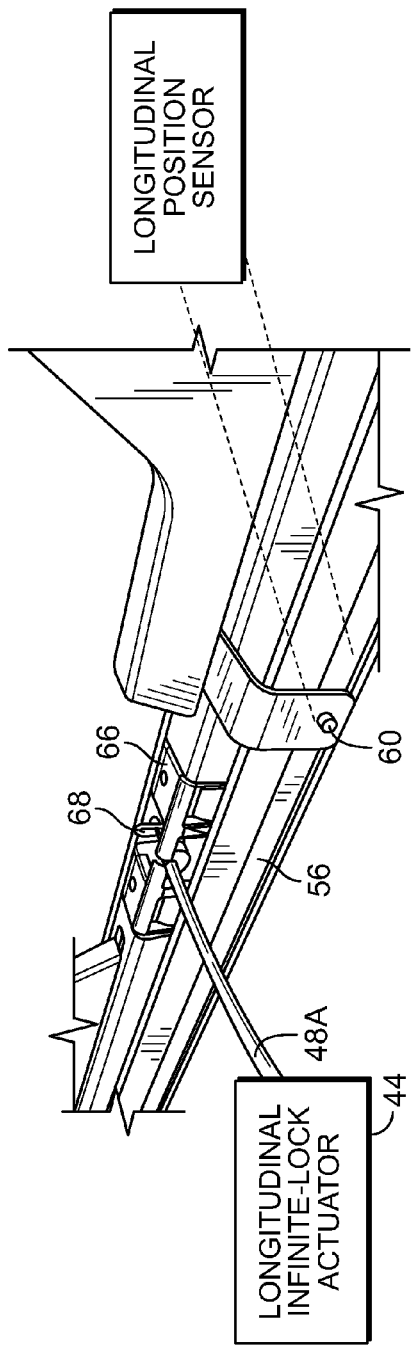
Figure 18:
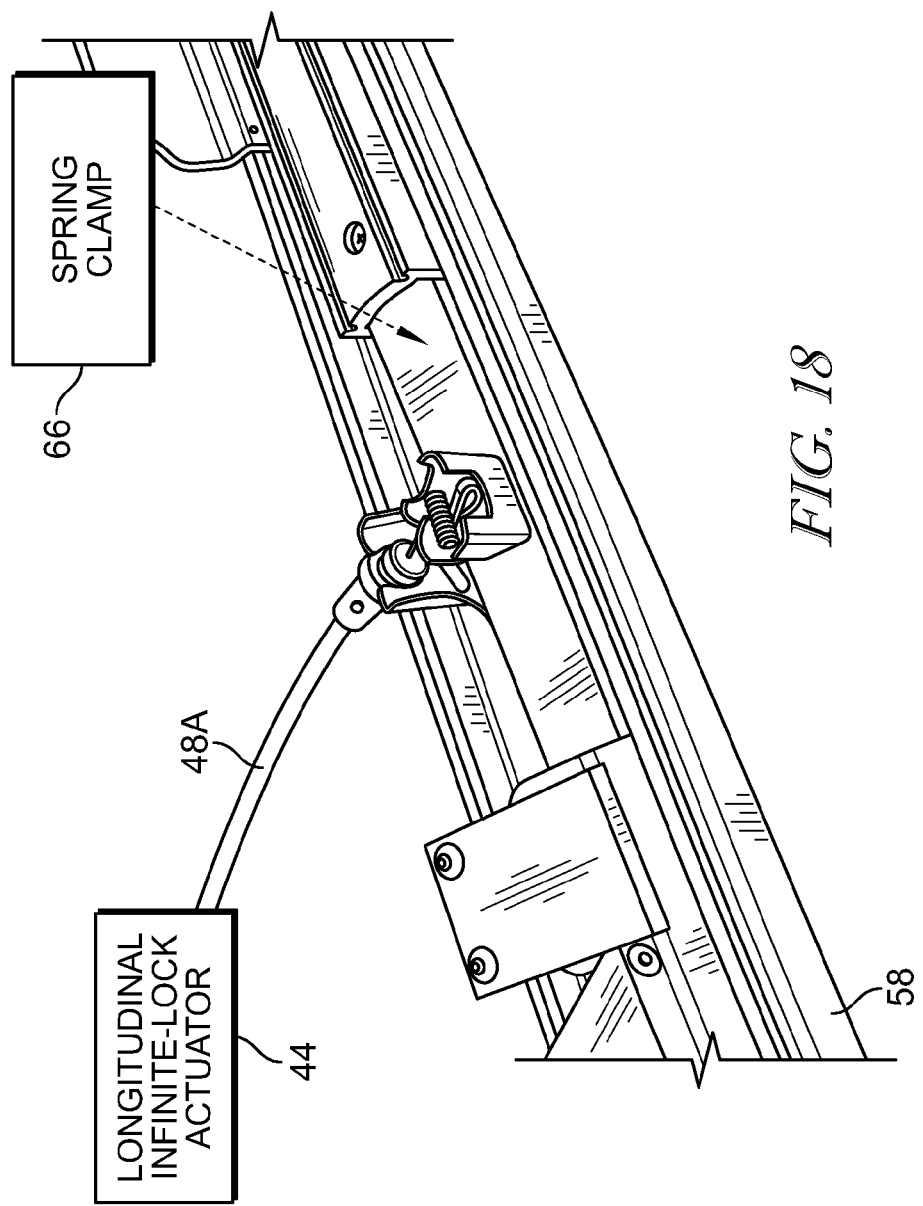
Figure 19:
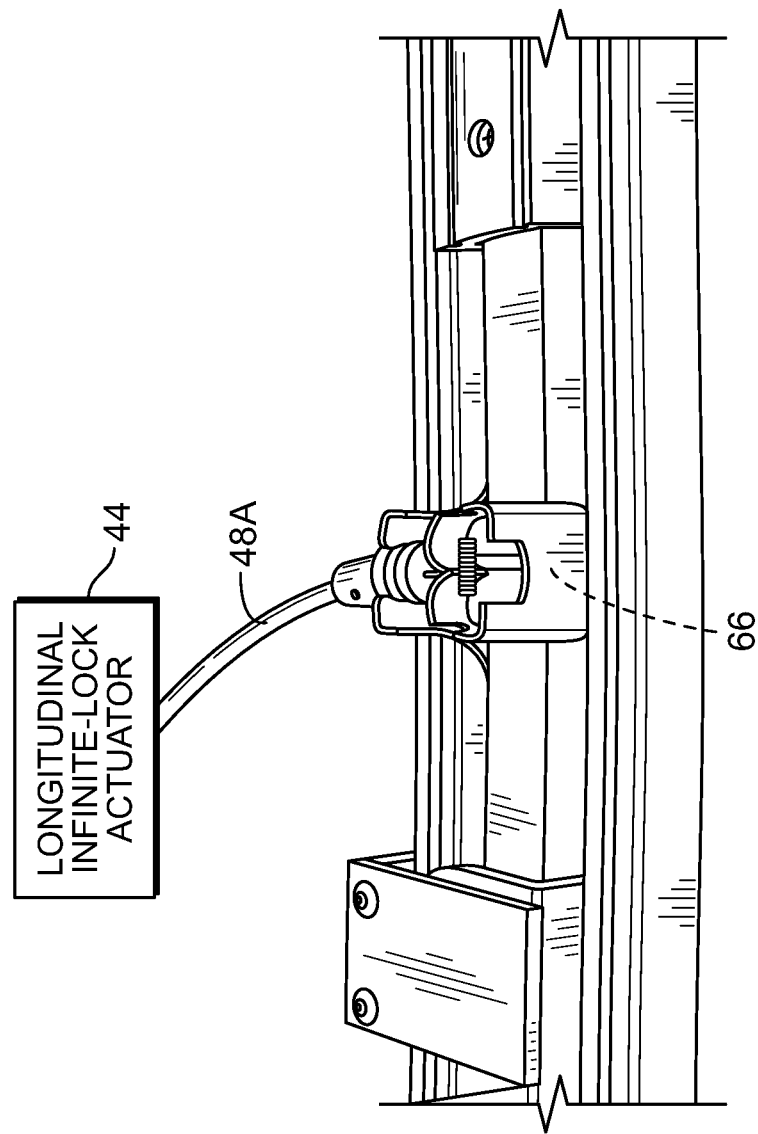
Figure 20:
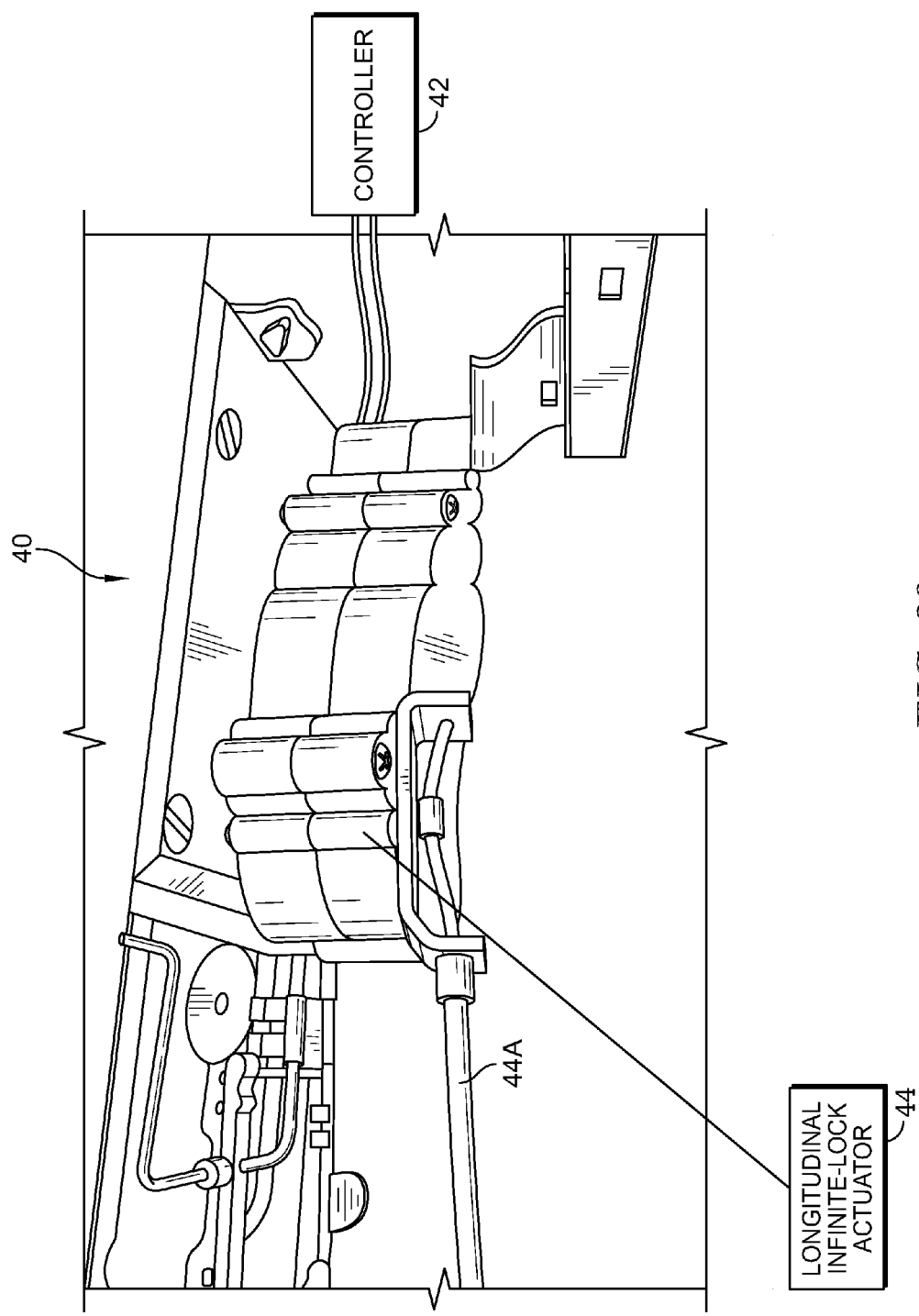
Figure 21:
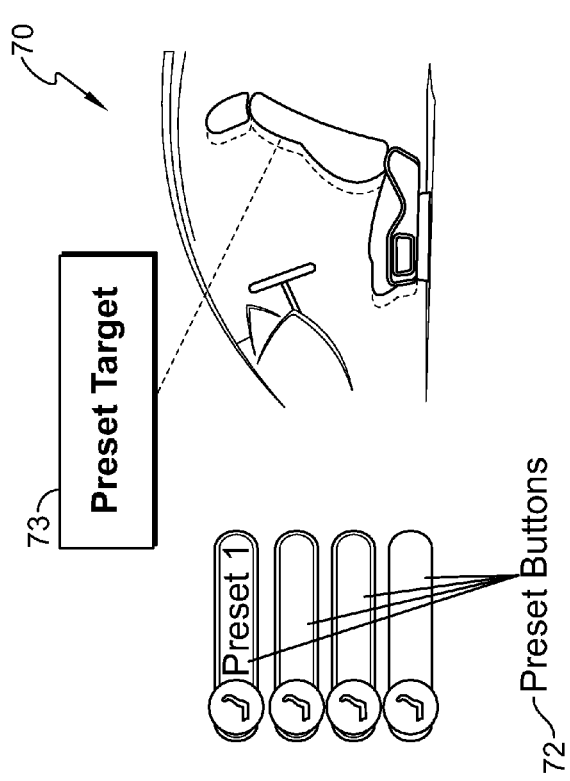
Figure 22:
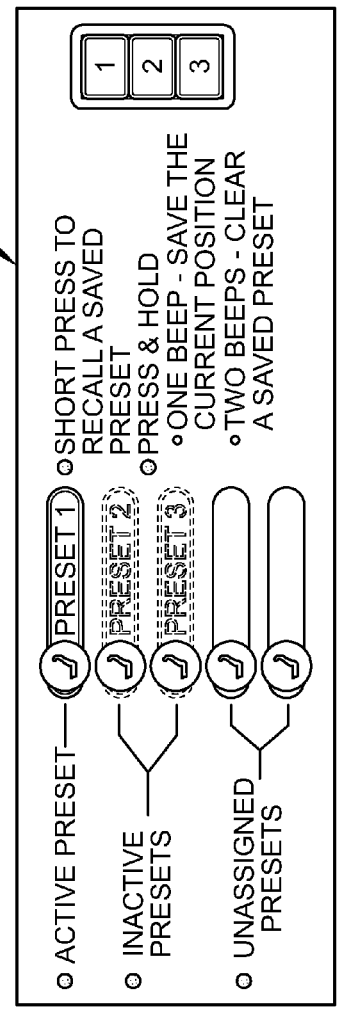
Figure 23:
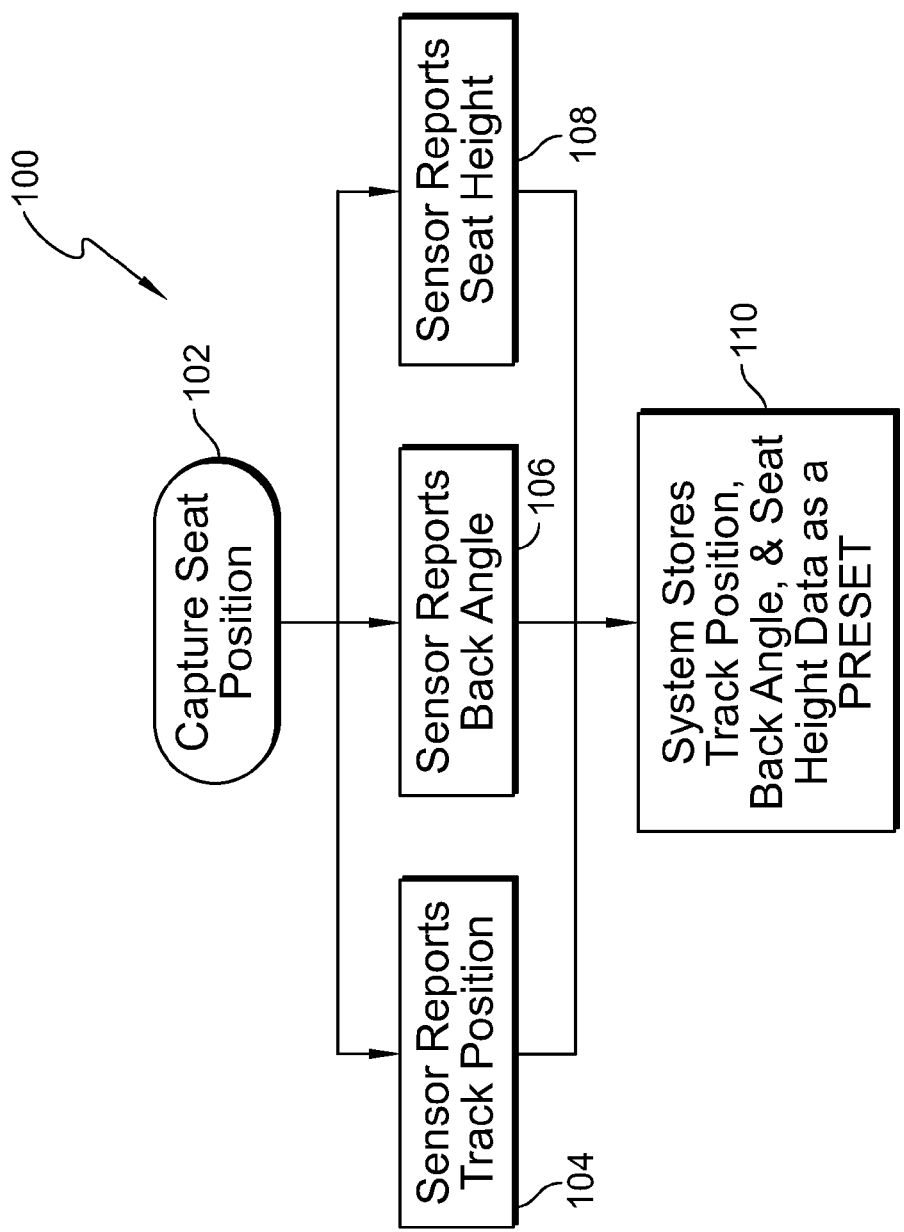
Figure 24:
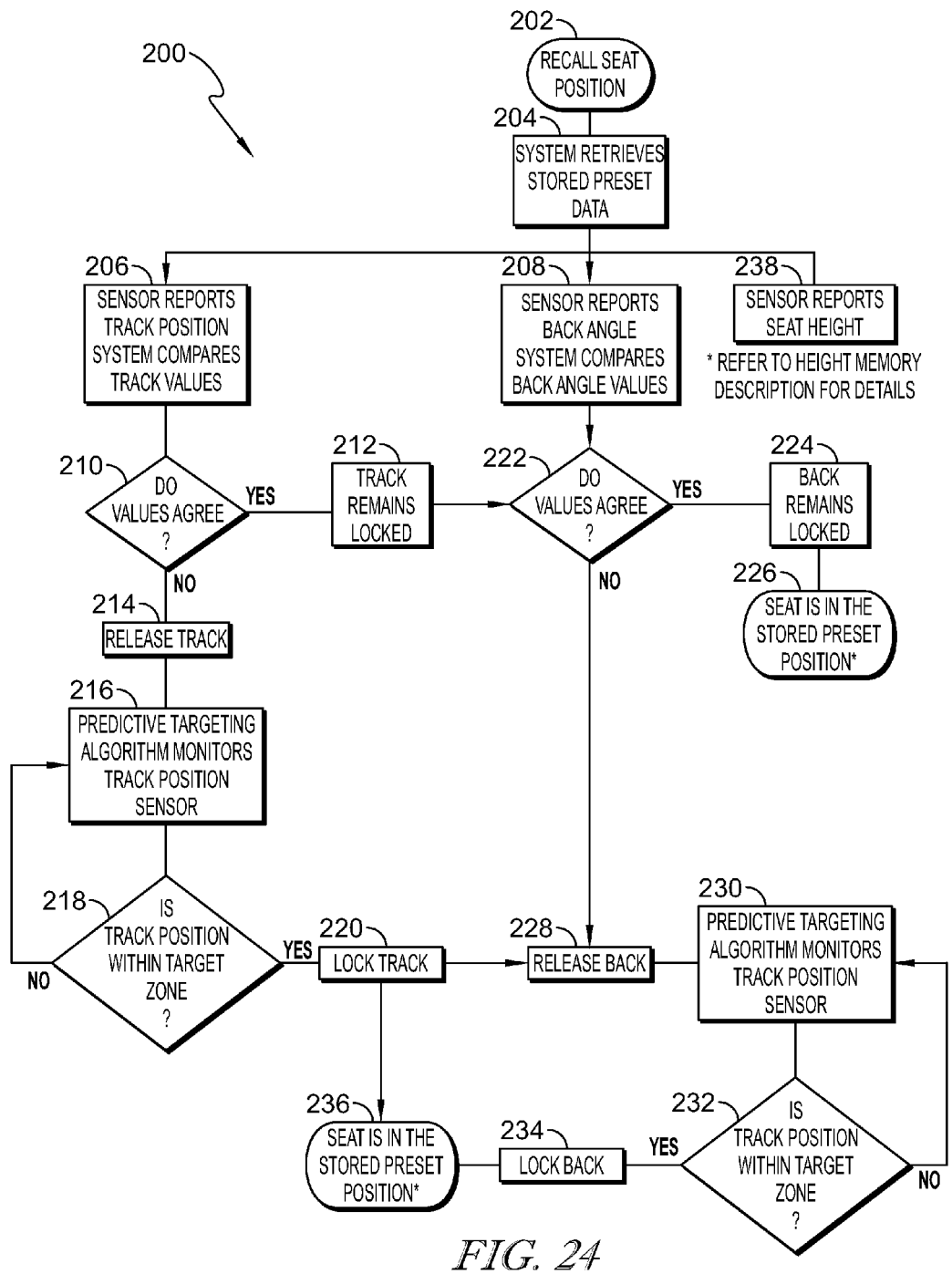
Figure 25:
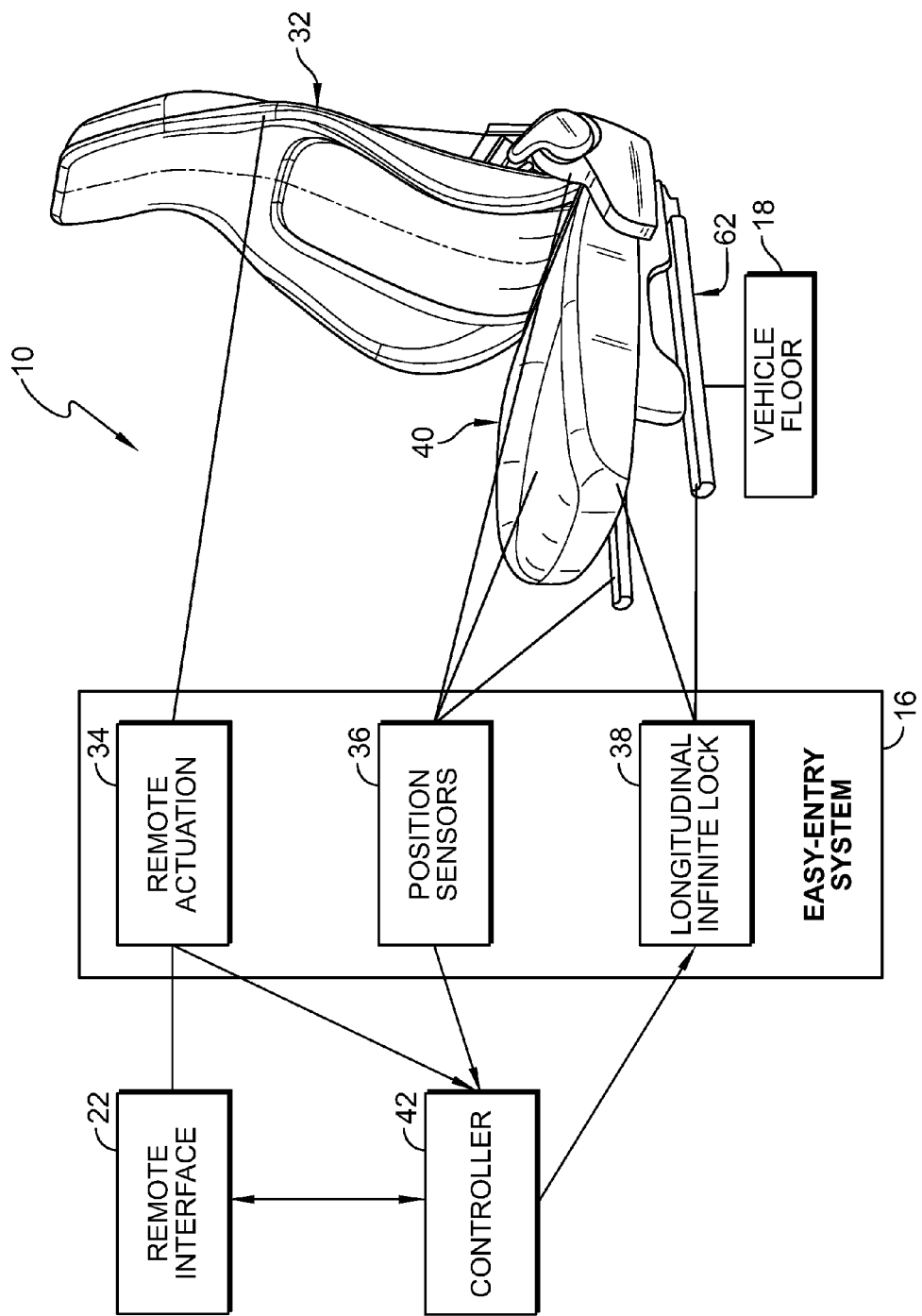
Figure 28:
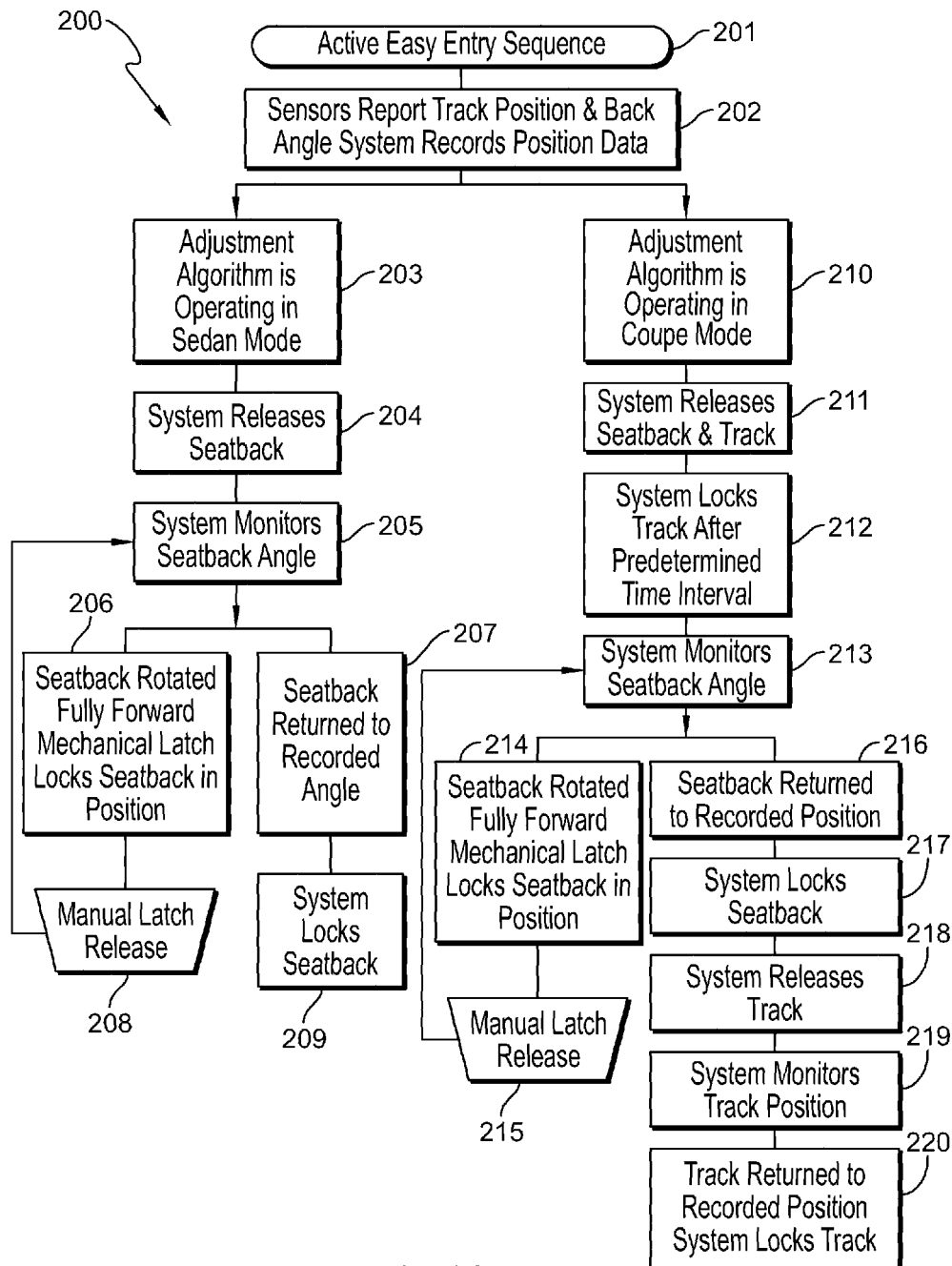
Figure 29:
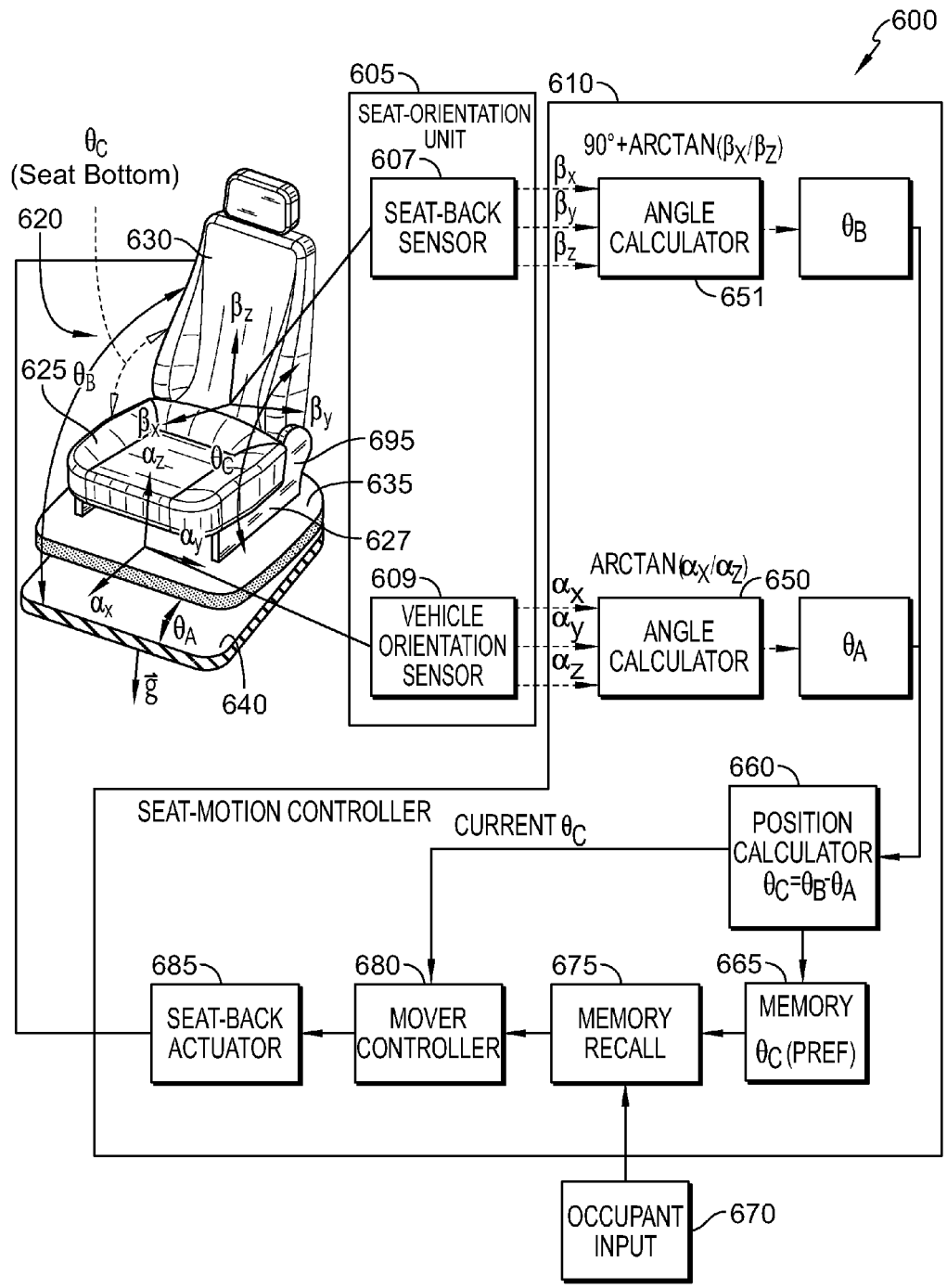
Figure 30:
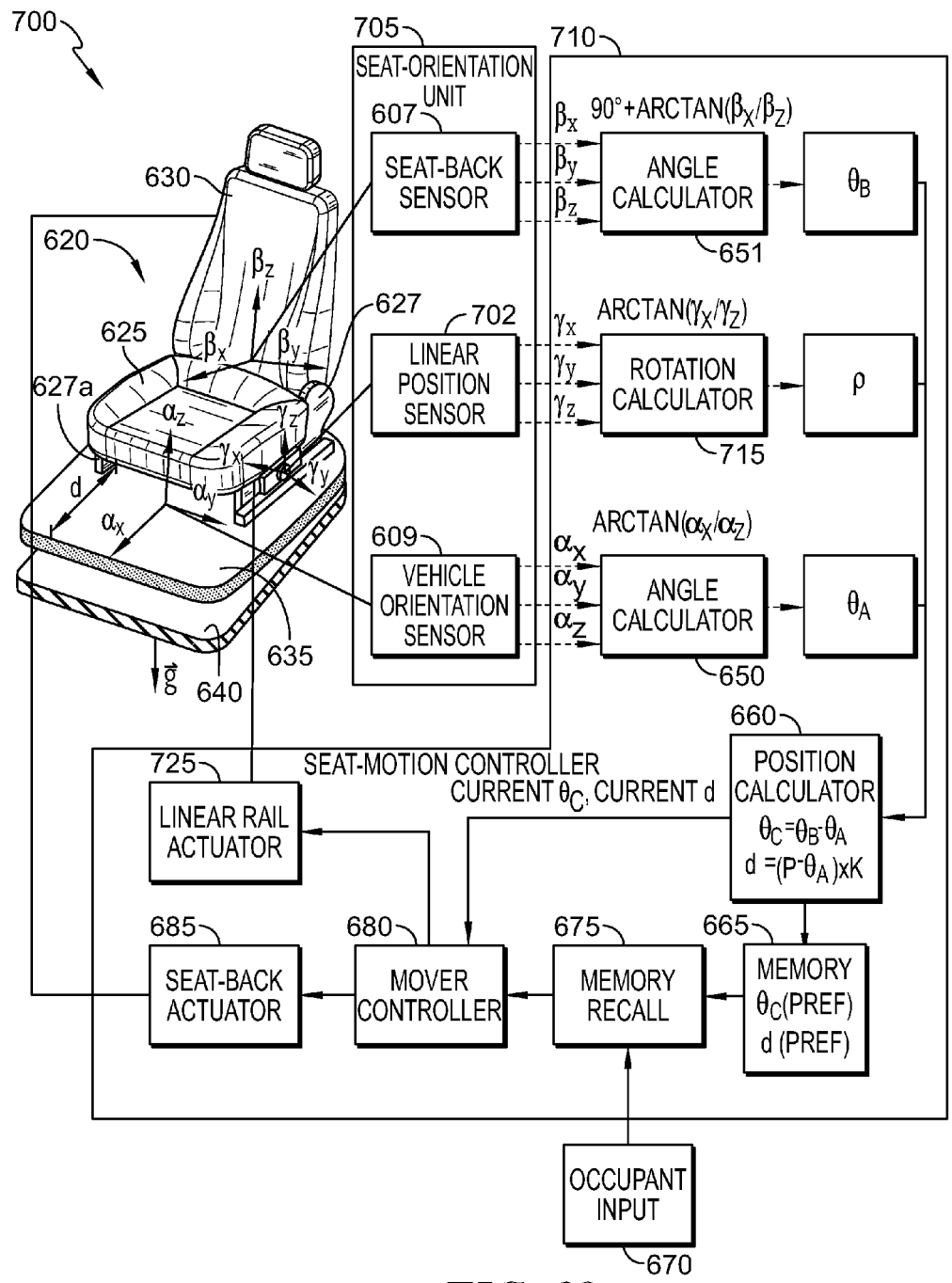
Figure 31:
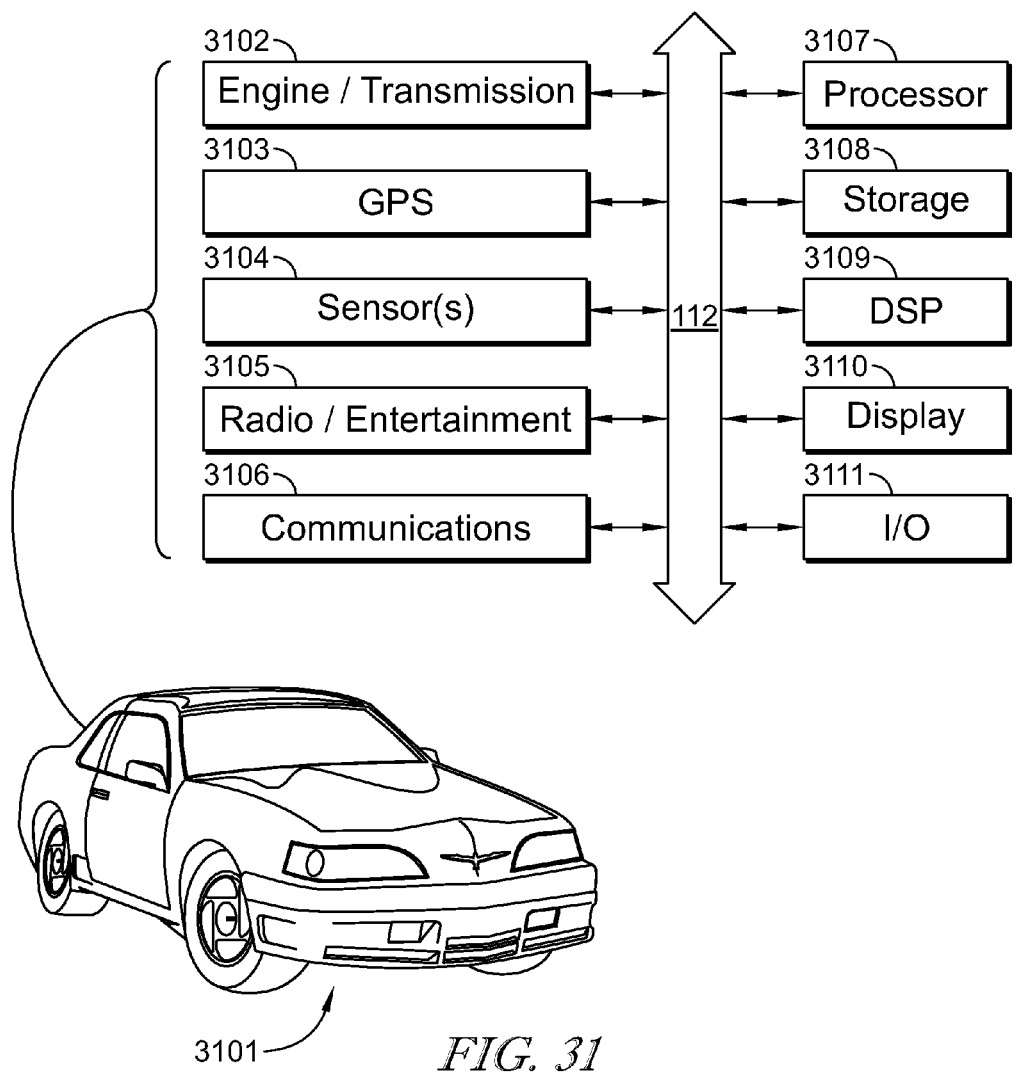
Figure 32:
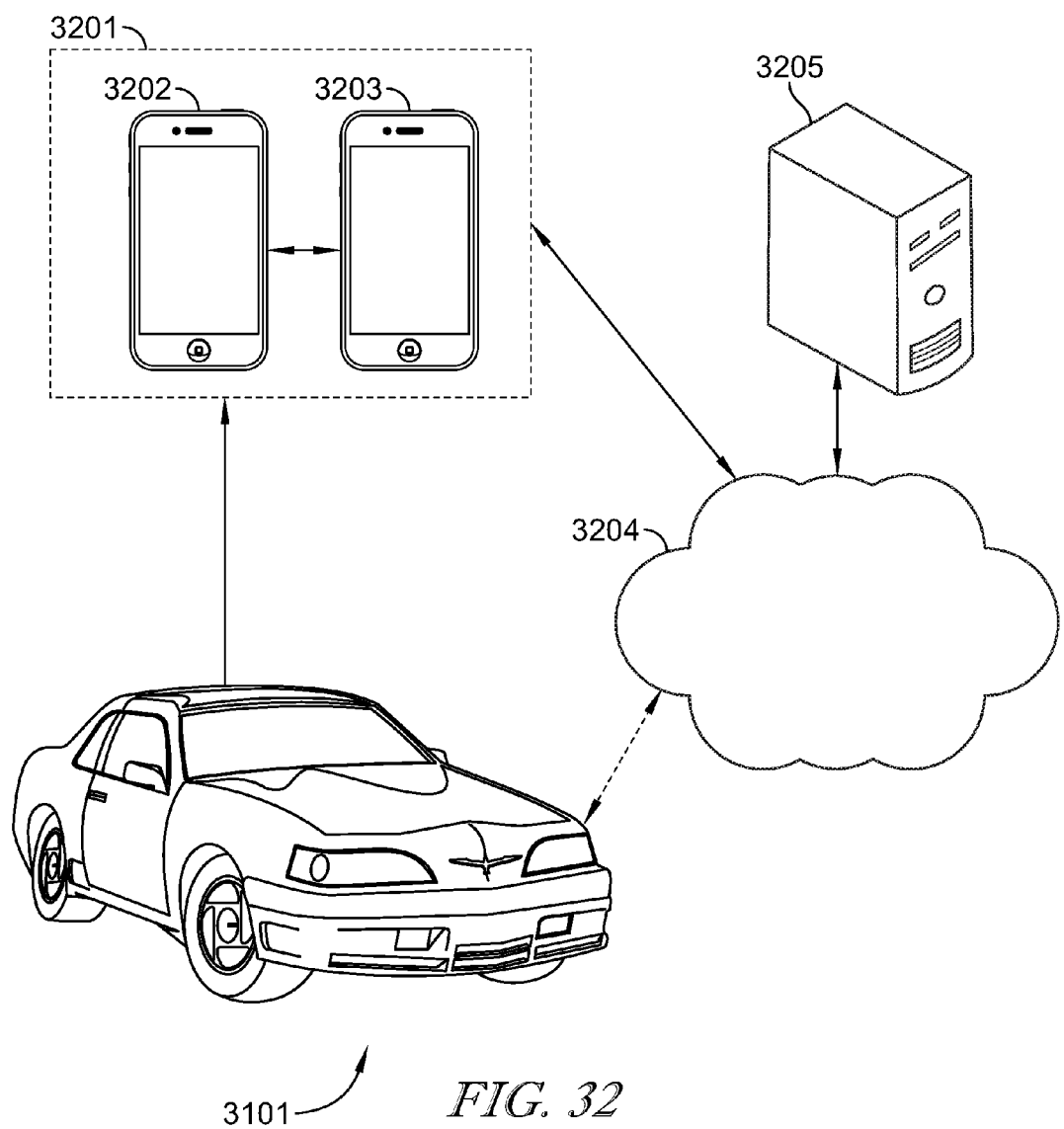

FIG. 3 is a perspective and diagrammatic view of the vehicle seat of FIG. 1 showing that the smart-height system includes a remote-actuation unit, a position-sensor unit, a longitudinal lock unit, and a smart-height mover configured to provide a predetermined vertical position of the vehicle seat relative to the vehicle floor associated with each longitudinal location of the vehicle seat under an illustrative embodiment;

FIG. 4 is a partial exploded assembly view and diagrammatic view of the vehicle seat of FIG. 3 showing that the smart-height system includes, from top to bottom, a controller, a longitudinal-lock actuator, a longitudinal lock, a seat-height mover, and a seat-height position sensor under an illustrative embodiment;

FIG. 5 is an enlarged partial perspective and diagrammatic view of the smart-height system of FIGS. 3 and 4 showing that the seat-height mover includes a seat-height actuator, a seat-height input plate, and a seat-height support link and that the seat-height position sensor is coupled to the seat-height support link to sense a position of the seat-height support link under an illustrative embodiment;

FIG. 6 is an enlarged view of the seat of FIG. 4 showing a seat-height position sensor included in a smart-height system under an illustrative embodiment;

FIG. 7 shows a side view of a vehicle seat including a seat-height mover, a longitudinal lock, and a seat-back actuator under an illustrative embodiment;

FIG. 8 is a photograph of another display screen shown on the interactive display during use of the vehicle seat showing how the vertical position of the vehicle seat varies according to the longitudinal position of the vehicle seat and suggesting that variation from the predetermined curve may be controlled according to various best-fit approximations under an illustrative embodiment;

FIG. 9 is a diagrammatic view showing a portion of a process in which a stored arrangement including a vertical position of the vehicle seat is recalled and the controller commands the vehicle seat to move to the stored arrangement under an illustrative embodiment;

FIG. 10 is a diagrammatic view showing a portion of a process in which a user moves the vehicles seat manually along the longitudinal path and the controller causes the vertical position of the vehicle seat to move along the predetermined vertical position associated with the longitudinal position of the vehicle seat under an illustrative embodiment;

FIG. 11 is a perspective and diagrammatic view of the vehicle seat of FIG. 1 showing that the manual-memory system includes the remote-actuation unit configured to provide remote actuation of actuators included in the various systems of the vehicle seat, the position-sensor unit configured to sense a longitudinal position of the vehicles seat, the vertical position of the vehicle seat, and an angular position of the seat back included in the vehicle seat, and the longitudinal lock unit configured to selectively block movement of the vehicle seat relative to the vehicle floor along a longitudinal path at any position along the path under an illustrative embodiment;

FIG. 12 is a partial exploded assembly view and diagrammatic view of the vehicle seat of FIG. 11 showing that the manual-memory system includes, from top to bottom, the controller, the seat back-position sensor, the seat-back actuator, the longitudinal lock actuator, the longitudinal position sensor, and the longitudinal lock under an illustrative embodiment;

FIG. 13 shows a vehicle seat comprising a seat-back position sensor coupled to both the seat back and the seat bottom included in the vehicle seat under an illustrative embodiment;

FIG. 14 is an enlarged portion of FIG. 13 showing the seat-back position sensor;

FIG. 15 is a partial perspective and diagrammatic view of the vehicle seat of FIG. 11 showing a portion of the longitudinal lock unit coupled to a slide mechanism included in a seat-bottom foundation and the longitudinal lock actuator coupled to a spring clamp included in the longitudinal lock unit;

FIG. 16 is an exploded assembly view of the spring clamp of FIG. 15 showing that the spring clamp includes a guide rod coupled to the slide mechanism in a fixed position, a seat-bottom mount coupled to the guide rod to slide back and forth along the guide rod, and a torsion spring coupled to the guide rod to move between an engaged position in which a first friction force engages the guide rod to block movement of the seat-bottom mount and seat-bottom relative to the floor and a disengaged position in which a relatively smaller second force engages the guide rod and allows movement of the seat-bottom relative to the floor;

FIG. 17 is a partial perspective and diagrammatic view of the vehicle seat of FIG. 11 showing a longitudinal position sensor a potentiometer strip coupled in a fixed position to a stationary portion of the slide mechanism seat-bottom foundation and a deflector coupled to a moving portion of the slide mechanism and configured to engage a portion of the potentiometer strip so that an absolute location of the vehicle seat along the longitudinal path is known;

FIG. 18 shows a portion of a longitudinal lock unit included in a vehicle seat under an illustrative embodiment;

FIG. 19 shows another perspective of the portion of the longitudinal lock unit of FIG. 18 under an illustrative embodiment;

FIG. 20 shows an illustrative longitudinal lock actuator coupled to an underside of a seat bottom included in the vehicle seat of FIGS. 18 and 19;

FIG. 21 shows a display screen presented on an interactive display during use of the vehicle seat indicating that one or more positions of the vehicle seat may be stored in memory of the controller under an illustrative embodiment;

FIG. 22 shows another display screen presented on the interactive display during use of the vehicle seat indicating how to recall a saved position, how to store a position in memory, and how to clear a position from memory under an illustrative embodiment;

FIG. 23 is a diagrammatic view showing a portion of a process in which an arrangement of the vehicle seat is stored in memory under an illustrative embodiment;

FIG. 24 is a diagrammatic view showing a portion of a process in which stored arrangements are recalled and the vehicles seat moves to the stored arrangement under an illustrative embodiment;

FIG. 25 is a perspective and diagrammatic view of the vehicle seat of FIG. 1 showing that the smart-height system includes the remote-actuation unit, the position-sensor unit, the longitudinal lock unit, and the smart-height mover configured to provide the predetermined vertical position of the vehicle seat relative to the vehicle floor associated with each longitudinal location of the vehicle seat under an illustrative embodiment;

FIG. 26 is a diagrammatic view showing how a user engages the remote-actuation unit to cause the vehicle seat to move to a predetermined entry arrangement in which the vehicle seat moves to a forward most position along the longitudinal path and the seat back moves to a forward most position relative to the seat bottom under an illustrative embodiment;

FIG. 27 is a view similar to FIG. 26 showing how the user engages the remote-actuation unit to cause the vehicle seat to return to the previous arrangement after the passenger has entered the vehicle; and FIG. 28 is a diagrammatic view of a portion of a process showing how a controller uses the various sensors and systems to move the vehicle seat to the entry arrangement under illustrative embodiments;

FIG. 29 is a perspective and diagrammatic view of a seat position sensing system including a seat-orientation unit configured to sense an orientation of a vehicle floor and a seat back relative to gravity so that a recline angle for the seat back relative to the vehicle floor may be calculated, and a seat-motion controller configured to move or facilitate manual adjustment of the seat back to predetermined angles of recline stored in the seat-motion controller;

FIG. 30 is a perspective and diagrammatic view of another embodiment of a seat position sensing system in accordance with the present disclosure showing that the seat-orientation unit further includes a linear position sensor coupled to the seat bottom to move therewith and configured to provide measurements used to calculate a longitudinal position of the vehicle seat relative to the vehicle floor;

FIG. 31 is an illustrative embodiment of a vehicle system block diagram in accordance with the present disclosure, comprising a plurality of modules coupled to a vehicle bus that include an engine/transmission module, vehicle and seat sensor modules, communications module, a processor, a storage module, a digital signal processing module, a display, and an input-output module for interacting vehicle components with the seat sensor signals; and FIG. 32 is an illustrative embodiment of a vehicle communications system in accordance with the present disclosure, wherein a vehicle may communicate with one or more external devices and each may be configured to communicate to at least one server over a network.

DETAILED DESCRIPTION

A vehicle seat 10 in accordance with the present disclosure is shown diagrammatically in FIG. 1. Vehicle seat 10 includes a smart-height system 14 which is configured to provide a predetermined vertical position of vehicle seat 10 relative to a vehicle floor 18 associated with each longitudinal location of vehicle seat 10 so that comfort and safety of a passenger are maximized. Features of smart-height system 14 may be configured to have unique use profiles such as cleaning a vehicle, where the seat may be elevated to gain access under a seat access, independently of moving forward. Various seat profile arrangements may have specific human-machine interfaces (HMI's) such as a button/switch located at a top/bottom rear of the seat so that the user can move the seat out of the way while cleaning the rear floor, without having to go forward to the front door to move the seat forward.

Vehicle seat 10 may be configured to be adjusted automatically, adjusted manually, or a combination of both. In certain illustrative embodiments, a seat system may determine a seat position on tracks underlying the seat and use seat optimization data to position the seat according to an automatic seat position memory, a user-set position memory, and/or a setting based on general population data that is optimized for comfort and safety. For example, seat positions, such as seat height, may be pre-stored for one or more generic positions that are based on general population data obtained from industry standards that may arrange one or more seat positions that accommodate, for example, 80-90 percent of the general population. In another example, users may enter personal and/or demographic data (e.g., male/female, age, height, weight, etc.) using an input (e.g., interactive touch-screen display or other vehicle data input, portable device, etc.), wherein the seat positioning system may arrange one or more seat positions that would accommodate a user's personal/demographic profile. In some illustrative embodiments, the vehicle seat positioning is configurable, and automatic settings may be overridden by a user and stored for future positioning.

Figure 1A:
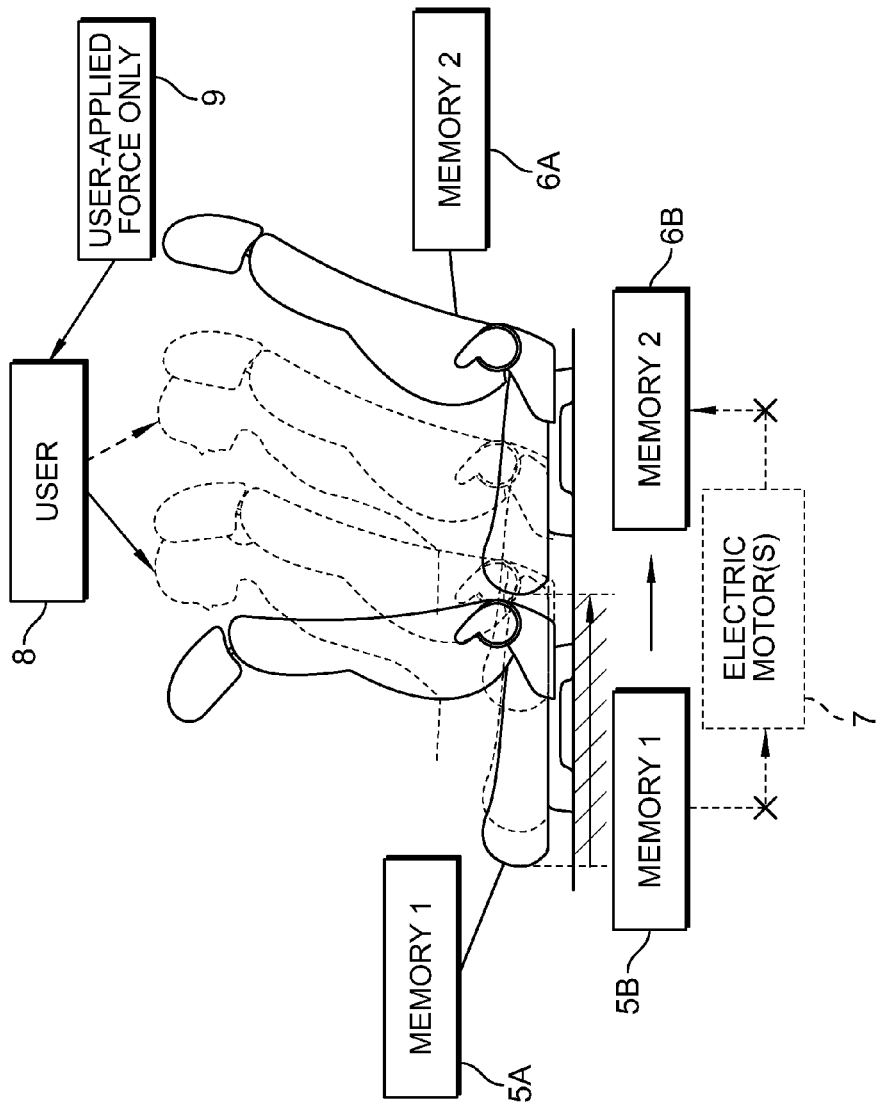

In one example, a vehicle seat may accommodate a user 8 and comprises a plurality of memory settings (5A, 6A) stored respectively in memory (5B, 6B), wherein a vehicle or seat system processor executes one or more algorithms to cause one or more electric motors 7 to adjust the seat from one positional configuration (5A) to another (6A) as suggested in FIG. 1A. As can be seen in the figure, the adjustments may be made in a lateral position of the seat, as well as a reclining position. The adjustments may be made automatically, or may be triggered by a user-applied force 9, which may comprise an application of force (e.g., pressing, pushing) or gesture.

Figure 2:
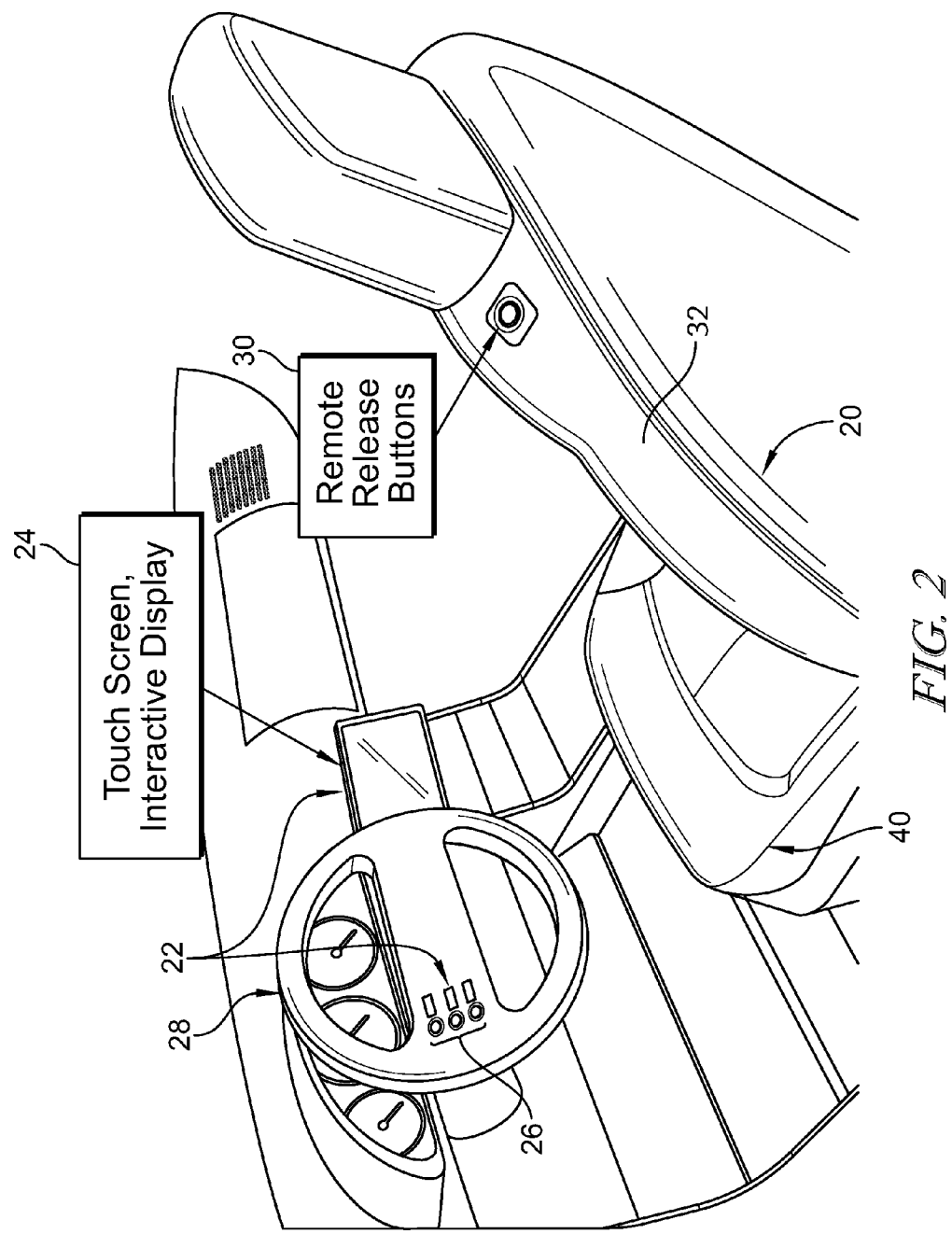
FIG. 2 shows a vehicle seat included in a vehicle cockpit that includes an interactive display, a first set of remote release buttons coupled to a steering wheel, and another remote release button coupled to a seat back of the vehicle seat under an illustrative embodiment.

Vehicle seat 10 may be incorporated in a vehicle as shown in FIG. 2, and may be part of an overall vehicle system as suggested in FIG. 31, and may comprise a remote interface 22 that includes an interactive display 24, a first set of remote release buttons 26 coupled to a steering wheel 28, and another remote release button 30 coupled to a seat back 32 of vehicle seat 10. Interactive display 24 is configured to provide graphical output to a passenger and receive input (e.g., force) from the passenger. Interactive display 24, first set of remote release buttons 26, and remote release button 30 may be used to store, wipe, or recall various arrangement of vehicle seat 10.

In some illustrative embodiments, vehicle seat 10 may be configured as shown in FIGS. 3 and 4. Vehicle seat 10 includes smart-height system 14 configured to provide a predetermined vertical position of vehicle seat 10 relative to vehicle floor 18 associated with each longitudinal location of vehicle seat 10 so that comfort and safety of a passenger are maximized. Smart-height system 14 includes a remote-actuation unit 34, a position-sensor unit 36, a longitudinal lock unit 38, and a seat-height mover 76 as shown in FIGS. 3-7. Remote-actuation unit 34 is configured to provide remote actuation of actuators included in the various systems of vehicle seat 10. Position-sensor unit 36 is configured to sense a longitudinal position of vehicle seat 10, a vertical position of vehicle seat 10, and an angular position of seat back 32. Longitudinal lock unit 38 is configured to selectively block movement of vehicle seat 10 relative to vehicle floor 18 along a longitudinal path at any position along the longitudinal path. Seat-height mover 76 is configured to provide the predetermined vertical position of vehicle seat 10 relative to vehicle floor 18 associated with each longitudinal location of vehicle seat 10 so that comfort and safety of a passenger are maximized. Other actuator/locking arrangements in accordance with the present disclosure may be used.

Seat-height mover 76 includes a seat-height actuator 78, a seat-height input plate 80, and a seat-height support link 82 as shown in FIG. 5. Seat-height input plate 80 is coupled to seat bottom 40 to pivot back and forth relative to seat bottom 40. Seat-height support link 82 is arranged to extend between and interconnect seat-bottom foundation 62, seat bottom 40, and seat-height input plate 80 as suggested in FIG. 5. Seat-height support link 82 is constrained to pivot on a first end at seat-bottom foundation 62 and at an opposite second end by seat-height input plate 80 and seat bottom 40. Seat-height actuator 78 is illustratively a motor having an output configured to engage and move seat-height input plate 80 so that as seat-height actuator 78 actuates, the vertical position of vehicle seat 10 varies.

Position-sensor unit 36 is coupled to a controller 42 and configured to sense the longitudinal position of vehicle seat 10, the vertical position of vehicle seat 10, and the angular position of seat back 32 as various actuators 44, 46, 78 move vehicle seat 10. As shown in FIGS. 5 and 6, position-sensor unit 36 further includes a seat-height position sensor 54. Seat-height position sensor 54 in one example is a linear potentiometer coupled to seat-bottom foundation 62 in a fixed position and coupled to seat-height support link 82 to move therewith. In another example, seat-height position sensor 54 is a hall-effect motor included in seat-height actuator 78.

As suggested in FIG. 3, seat-height mover 76 is coupled to controller 42 and is configured to respond to commands from controller 42. Controller 42 includes programming which coordinates vertical and longitudinal movement of vehicle seat 10. Controller 42 determines relative vertical position and longitudinal position using an equation, chart, or table to look up values for one when receiving the other value. In one example, a passenger provides an input to controller 42 which indicates that vehicle seat 10 should be raised relative to vehicle floor 18. As a result, controller 42 causes a graphic 84 to be displayed on interactive display 24 as shown in FIG. 8.

In this use example, the passenger has provided a command to controller 42 to cause vehicle seat 10 to raise and move off an optimum-arrangement curve 86 as suggested in FIG. 8. As a result, controller 42 uses one of several best-fit approximations 88, 90, 92, 94 of new passenger-specific curve 96. Controller 42 may move along these new curves so as to maximize comfort and accommodate the specific preferences of the passenger. In some illustrative embodiments, a user may interact via an input (e.g., touch display) to graphically adjust (e.g., touch and drag) passenger-specific curve 96 to replicate optimum-arrangement curve 86 (i.e., make curve 96 approximate curve 86). In response to user graphically adjusting curve 96, the signals may be sent from a processor to cause seat 10 to automatically make adjustments as graphic line 96 gets changed. Such an embodiment may be advantageous in that users often are not aware how seat adjustments relate to industry-specific norms for optimal user comfort and safety. Furthermore, by utilizing a graphical interface, a user may easily visualize the effects of a seat change, as it relates to industry norms, as it occurs. Deviations from various curves, including height curves, do not need to be limited to a 4-curve approximation, and may be configured to modify the slope of a default curve as well.

In one example, optimum-arrangement curve 86 is configured so that height of vehicle seat 10 above floor 18 is maximized when vehicle seat 10 is at a forward-most location. Optimum-arrangement curve 86 is further configured so that the height of vehicle seat 10 above floor 18 is minimized when vehicle seat 10 is at a rearward-most location. As a result, curve 86 provides for desired heights at all locations between the forward-most and rearward-most locations. The forward-most location may be associated with a person of short height and configured so that an eye level of the short person is at an appropriate point above floor 18. The rearward-most location may be associated with a person of tall height and configured so that an eye level of the tall person is an appropriate point above floor 18.

In one example, controller 42 causes graphics 70, 74 to be displayed on interactive display 24 (see FIGS. 21-22). Controller 42 also stores one or more programs in memory included in controller 42 that are executed by a processor include in controller 42. One example of a partial process 100 is shown in FIG. 23 which is executed by controller 42. Another example of a partial process 200 is shown in FIG. 24 which is executed by controller 42.

Controller 42 may execute an illustrative process 300 as shown, for example, in FIG. 9. Process 300 includes a series of operations which provide an arrangement of vehicle seat 10 that provides for recall of a vertical position of vehicle seat 10. Process 300 begins with an operation 302 in which seat-position is recalled by a passenger. Process 300 then proceeds to an operation 304 in which controller 42 retrieves a stored preset from memory that includes a stored longitudinal position, a stored vertical position, and a stored seat-back position. Process 300 then proceeds to an operation 306 in which seat-height position sensor 54 provides a signal to controller 42 for comparison to stored vertical position.

Process 300 then proceeds to an operation 308 to determine if the stored vertical position matches the sensed vertical position. If the values agree, process 300 proceeds to an operation 310 in which the vertical position remains unchanged. Process 300 then proceeds to an operation 312 which indicates that vehicle seat 10 has arrived at the stored preset. If the values do not agree, process 300 proceeds to an operation 314 in which movement of vehicle seat 10 is delayed based on the longitudinal position of vehicle seat 10.

Process 300 then proceeds in parallel to operation 316, 318 based on whether the sensed vertical position is above or below the stored vertical position. If the sensed vertical position is above the stored vertical position, process 300 proceeds to operation 316 and then operation 320 in which seat-height actuator 78 is activated to cause vehicle seat 10 to move down to a lower vertical position. If the sensed vertical position is below the stored vertical position, process 300 proceeds to operation 318 and then operation 322 in which seat-height actuator 78 is activated to cause vehicle seat 10 to move up to a higher vertical position.

Process 300 then proceeds to an operation 324 in which controller 42 monitors seat-height position sensor 54 and calculates a predicted vertical position of vehicle seat 10. Process 300 then proceeds to an operation 326 which determines if the vertical position is in a target zone which causes vehicle seat 10 to be at the stored vertical position if movement of vehicle seat 10 stopped. If the predicted vertical position is in the target zone, process 300 proceeds to an operation 328 which causes seat-height actuator 78 to stop. Process 300 then proceeds to an operation 330 which indicates that vehicle seat 10 is in the stored preset arrangement. If the predicted vertical position is not in the target zone, process 300 returns to operation 324.

Controller 42 may execute an illustrative process 400 as shown, for example, in FIG. 10. Process 400 includes a series of operations which provide an arrangement of vehicle seat 10 that coordinates vertical and longitudinal movement of vehicle seat 10. Process 400 begins with an operation 402 in which controller 42 receives a command from a passenger that causes controller 42 to coordinate the vertical position of vehicle seat 10 with an input longitudinal position of vehicle seat 10 as shown in FIG. 6. Process 400 then proceeds to an operation 404 in which a passenger manually adjusts a longitudinal position of vehicle seat 10. Process 400 then proceeds simultaneously to three operations 406, 408, 410 associated with the mode of operation of vehicle seat 10. In operation 406, seat height was set initially by the passenger in a manual action. In operation 408, seat height was set initially according to a preset arrangement of the vehicle seat. In operation 410, seat height was set initially according to optimum-arrangement curve 86. If seat height was initially set by either operation 406, 408, process 400 then proceeds to an operation 412 in which longitudinal position sensor 50 provides a sensor signal to controller 42 indicative of the current longitudinal position of vehicle seat 10. Process 400 then proceeds to operation 414 which delays vertical adjustment of vehicle seat 10.

Process 400 then proceeds to an operation 416 in which seat-height position sensor 54 also provides a sensor signal to controller 42 indicative of current vertical position of vehicle seat 10. Process 400 then proceeds to an operation 418 in which controller determines a target height using a table, equation, or a chart as shown in FIG. 4 using current sensed longitudinal position. Process 400 then proceeds to an operation 420 which compares the sensed vertical position with the target vertical position. If the sensed vertical position is above the target vertical position, process 400 proceeds to operation 424 and then to operation 426 in which seat-height actuator 78 is activated to cause vehicle seat 10 to move down to a lower vertical position. If the sensed vertical position is below the target vertical position, process 400 proceeds to operation 426 and then to operation 428 in which seat-height actuator 78 is activated to cause vehicle seat 10 to move up to a higher vertical position.

Process 400 then proceeds to an operation 430 in which controller 42 monitors seat-height position sensor 54 and calculates a predicted vertical position of vehicle seat 10. Process 400 then proceeds to an operation 432 which determines if the vertical position is in a target zone which causes vehicle seat 10 to be at the target vertical position if movement of vehicle seat 10 is stopped. If the predicted vertical position is in the target zone, process 400 proceeds to an operation 434 which causes seat-height actuator 78 to stop. Process 400 then proceeds to an operation 436 which indicates that vehicle seat 10 is in the target vertical position. If the predicted vertical position is not in the target zone, process 400 returns to operation 428.

Manual-memory system 12 includes remote-actuation unit 34, position-sensor unit 36, and longitudinal lock unit 38 (sometimes referred to herein as a lock unit) as shown in FIGS. 11 and 12. Remote-actuation unit 34 is configured to provide remote actuation of actuators included in the various systems of vehicle seat 10. Position-sensor unit 36 is configured to sense a longitudinal position of vehicle seat 10, a vertical position of vehicle seat 10, and an angular position of seat back 32 included in vehicle seat 10. Longitudinal lock unit 38 is configured to selectively block movement of vehicle seat 10 relative to vehicle floor 18 along a longitudinal path at any position along the longitudinal path.

As shown in FIG. 12, manual-memory system 12 further includes controller 42. Controller 42 is a seat controller in one example and included in vehicle seat 10. In another example, controller 42 is a controller included in the vehicle and not included in any specific vehicle seat or vehicle system. Controller 42 is coupled to remote interface 22 to send and receive information. Controller 42 is further coupled to position-sensor unit 36 to receive sensor data about vehicle seat 10. Controller 42 is also coupled to remote-actuation unit 34 to cause longitudinal lock unit 38 to move between engaged and disengaged positions. Remote-actuation unit 34 includes remote interface 22, a longitudinal lock actuator 44, and a seat-back actuator 46 as shown in FIGS. 12, 15, and 20. Remote interface 22 receives signals provided by the passenger and communicates the signals to controller 42. Controller 42 then issues appropriate commands to longitudinal lock actuator 44 and seat-back actuator 46 to cause vehicle seat 10 to move in desirable ways.

Longitudinal lock actuator 44 causes longitudinal lock unit 38 to move between the engaged position in which longitudinal movement of vehicle seat 10 is blocked and the disengaged position in which longitudinal movement of vehicle seat 10 is allowed. As suggested in FIGS. 12, 15, and 20, longitudinal lock actuator 44 is coupled to an underside of seat bottom 40 and is coupled to longitudinal lock unit 38 by a pair of Bowden cables 48A, 48B, or other suitable connectors. Seat-back actuator 46 causes seat back 32 to pivot back and forth relative to a seat bottom 40. Seat-back actuator 46 is coupled to one side of seat back 32 as shown in FIGS. 5 and 12.

Position-sensor unit 36 is coupled to controller 42 and configured to sense the longitudinal position of vehicle seat 10, the vertical position of vehicle seat 10, and the angular position of seat back 32 as various actuators 44, 46 move vehicle seat 10. As suggested in FIGS. 13, 14, 17, and 26, position-sensor unit 36 includes longitudinal position sensor 50, a seat-back position sensor 52, and seat-height position sensor 54. Longitudinal position sensor 50 determines the longitudinal position of vehicle seat 10 along the longitudinal path of vehicle seat 10 relative to vehicle floor 18. Seat-back position sensor 52 determines an angular position of seat back 32 relative to seat bottom 40. Seat-height position sensor 54 determines a vertical position of vehicle seat 10 relative to vehicle floor 18.

One example of longitudinal position sensor 50 is shown in FIG. 17. Longitudinal position sensor 50 includes a potentiometer strip 56 or other suitable configuration or alternative coupled in a fixed position to a stationary portion of a slide mechanism 58 included in vehicle seat 10 and a deflector 60 coupled to a moving portion of slide mechanism 58 as shown in FIG. 17. Deflector 60 is configured to engage a portion of potentiometer strip 56 so that absolute location of seat bottom 40 is known. Controller 42 is coupled to longitudinal position sensor 50 to receive a signal therefrom indicative of an absolute position of vehicle seat 10 relative to vehicle floor 18.

One example of seat-back position sensor 52 is shown in FIGS. 13 and 14. Seat-back position sensor 52 is, for example, a rotary potentiometer coupled to an inboard recliner include in seat back 32. In another example, seat-back position sensor 52 is a hall-effect actuator used as seat-back actuator 46. Controller 42 is coupled to seat-back position sensor 52 to receive a signal therefrom indicative of a position of seat back 32 relative to seat bottom 40.

Longitudinal lock unit 38 is used by a passenger to selectively block or allow translating movement of vehicle seat 10 relative to vehicle floor 18. Longitudinal lock unit 38 allows seat bottom 40 and seat back 32 to move on slide mechanism 58 included in a seat-bottom foundation 62 and be retained at any one of positions along the longitudinal path as suggested in FIGS. 15-19. Longitudinal lock unit 38 may be used in cooperation with controller 42 and remote-actuation unit 34 or with a manual actuator in which force is applied by the passenger.

Longitudinal lock unit 38 includes a guide rod 64 coupled to slide mechanism 58 in a fixed position, a seat-bottom mount 66 coupled to guide rod 64 to slide back and forth along guide rod 64, and a spring clamp 68 as shown in FIG. 16. Spring clamp 68 is coupled to guide rod 64 to move between an engaged position and a disengaged position. When longitudinal lock unit 38 is in the engaged position, a first friction force engages guide rod 64 to block movement of seat-bottom mount 66 and seat bottom 40 relative to vehicle floor 18. When longitudinal lock unit 38 is in the disengaged position, a relatively smaller second force engages guide rod 64 and allows movement of seat bottom 40 relative to vehicle floor 18. In one illustrative example, spring clamp 68 is a torsion spring and the torsion spring is moved by the associated Bowden cable 48 which is coupled to longitudinal lock actuator 44.

Longitudinal lock unit 38 allows for the passenger to move vehicle seat 10 and lock it at any location along the longitudinal travel path of vehicle seat 10. Longitudinal lock unit 38 also provides for an enhanced more premium feel to the passenger while maximizing value and minimizing waste.

In one example of use, a passenger selects a preset or stored arrangement of vehicle seat 10 using remote interface 22 or other suitable input. The passenger may push one of remote release buttons 26 or touch a graphic displayed on interactive display 24. As shown in FIG. 21, a first graphic 70 is displayed which shows how vehicle seat 10 can be adjusted as a result of engaging preset button 72. As a result of the passenger engaging preset button 72, controller 42 issues commands to remote-actuation unit 34 to cause actuators to move allowing vehicle seat 10 and seat back 32 to move until the preset arrangement is sensed by position-sensor unit 36.

Another graphic 74 which may be displayed on interactive display 24 is shown in FIG. 22. Graphic 74 indicates how buttons on interactive display 24 and remote release buttons 26 may be used. In one example, controller 42 or other processor causes graphics 70, 74 to be displayed on interactive display 24. Controller 42 also stores one or more programs in memory included in controller 42 that are executed by a processor include in controller 42. One example of a partial process 100 is shown in FIG. 23 which is executed by controller 42. Another example of a partial process 200 is shown in FIG. 24 which is executed by controller 42.

Process 100 as illustrated in the embodiment of FIG. 23 includes a series of operations which provide an arrangement of vehicle seat 10 that may be stored or discarded by controller 42. Process 100 begins with a capture seat position operation 102 which causes controller 42 to receive signals from position-sensor unit 36. Process 100 then proceeds to simultaneous operations 104, 106, 108 in which longitudinal position sensor 50, seat-back position sensor 52, and seat-height position sensor 54 all provide signals to controller 42. Process 100 then proceeds to operation 110 in which the provided signals are stored in memory as a preset arrangement of vehicle seat 10.

Process 200 includes a series of operations in which the preset arrangement is recalled and vehicle seat 10 is moved to the preset arrangement as suggested in FIG. 24. Process 200 begins with a recall position operation 202 which causes controller 42 to begin process 200. Process 200 then proceeds to an operation 204 in which controller 42 retrieves preset data stored in memory. Next process 200 proceeds to operations 206, 208 in which signals from position-sensor unit 36 are received.

Process 200 then proceeds to an operation 210 to determine if the sensed longitudinal position of vehicle seat 10 matches the stored longitudinal position. If the positions match, process 200 proceed to operation 212 where longitudinal lock unit 38 remains locked. If the positions do not match, process 200 proceeds to operation 214 in which longitudinal lock unit 38 is unlocked. Process 200 then proceeds to an operation 216 which monitors longitudinal position of vehicle seat 10 while vehicle seat 10 is moved along the longitudinal path. Process 200 then proceeds to an operation 218 in which the monitored longitudinal location is compared to the stored longitudinal location. If the positions match, process 200 proceed to operation 220 in which longitudinal lock unit 38 is locked in place at the right moment so that vehicle seat 10 is at the stored longitudinal location. If the positions do not match, process 200 proceeds to back to operation 216.

After process 200 receives sensor signal from position-sensor unit 36 in operation 208, process 200 proceeds to an operation 222 in which the sensed seat-back position is compared to the stored seat-back position. If the values agree, process 200 proceeds to an operation 224 in which seat back 32 is locked in place. Process 200 then proceeds to an operation 226 which terminates process 200 when the longitudinal positions also match. If the values do not agree, process 200 proceeds to an operation 228 in which seat back 32 is released to move relative to seat bottom 40. Process 200 then proceeds to an operation 230 in which controller 42 predicts where to lock seat back 32 to cause seat back 32 to be in the stored seat-back position. Process 200 then proceeds to an operation 232 which determines if seat back 32 is in a zone which will allow seat back 32 to be at the stored seat-back position when seat back 32 is locked. If seat back 32 is not in the zone, process 200 proceeds back to operation 232. If seat back 32 is in the zone, process 200 proceeds to an operation 234 in which seat back 32 is locked. Process 200 then proceeds to an operation 236 in which process 200 terminates when vehicle seat 10 is in the stored longitudinal position.

Vehicle seat 10 in accordance with the present disclosure is shown in FIG. 25. Vehicle seat 10 includes easy-entry system 16 configured to move a vehicle seat between a predetermined entry arrangement and one of the previously stored positions as disclosed herein. Easy-entry system 16 includes remote-actuation unit 34, position-sensor unit 36, seat-height mover 76, and longitudinal lock unit 38 as shown in FIG. 25. In one example use scenario, a rear passenger desires to make entry into a rear passenger seat easier. To do this, the rear passenger engages remote release button (30) included in vehicle seat 10 to cause a signal to be sent to controller 42. As a result, controller 42 immediately frees both longitudinal lock unit 38 and seat-back actuator 46 to move freely in response to application of force by the rear passenger. The rear passenger then applies force to seat back 32 to cause vehicle seat 10 to move to a forward-most position on the longitudinal path and seat back 32 to move a forward most angle so that space between the front vehicle seat and the rear vehicle seat are maximized as suggested in FIG. 26. Once the front vehicle seat is in the predetermined easy-entry arrangement, controller 42 commands both longitudinal lock unit 38 and seat-back actuator 46 to lock in the predetermined easy-entry arrangement. Once rear passenger is seated in the rear vehicle seat, the rear passenger engages remote release button 30 causing controller 42 to free both longitudinal lock unit 38 and seat-back actuator 46 to move freely in response to application of force by the rear passenger back to the previous position as suggested in FIG. 27. Other actuator arrangements in accordance with the present disclosure may be used as well.

Controller 42 includes a process 200 stored in memory for using easy-entry system 16 as suggested in FIG. 28. Process 200 includes a series of operations which provide for use of easy-entry system 16. Process 200 begins with an operation 202 in which controller 42 receives a command from a passenger that causes controller 42 to begin process 500 as shown in FIG. 28. Process 200 then proceeds to an operation 202 in which position-sensor unit 36 provides sensor data to controller 42 for both longitudinal position and seat-back position for an original arrangement. Process 200 then proceeds down two different paths depending on whether controller 42 is in a sedan mode or a coupe mode, which may affect seat locks via a position being achieved, or an interval time out feature.

Starting with the sedan mode, process 200 proceeds to operation 203 which is identification that controller 42 is in the sedan mode. Process 200 then proceeds to an operation 204 in which controller 42 commands seat-back actuator 46 to free seat back 32 to move freely relative to seat bottom 40. Process 200 then proceeds to an operation 205 in which seat-back position sensor 52 provides a signal indicative of seat-back position to controller 42. Process 200 then proceeds to an operation 206 in which seat back 32 is moved to a forward most position and is locked in the forward-most position when seat back 32 reaches the forward most position. Process 200 then proceeds to an operation 208 in which seat back 32 is manually released to move freely. The manual release may be from either engagement directly of seat-back actuator 46 or through engagement of remote release button 30. Process 200 then returns to operation 205.

Process 200 proceeds to an operation 207 instead of operation 206 when seat back 32 is returned to the original arrangement. Process 200 then proceeds to an operation 209 in which seat-back actuator 46 is locked blocking additional rotation of seat back 32 relative to seat bottom 40.

Starting with the coupe mode, process 200 proceeds to operation 210 which is identification that controller 42 is in the coupe mode. Process 500 then proceeds to an operation 211 in which controller 42 commands seat-back actuator 46 and longitudinal lock actuator 44 to free seat back 32 and vehicle seat 10 to move freely. Process 500 then proceeds to an operation 212 in which a time interval passes and controller 42 commands longitudinal lock actuator 44 to lock blocking movement of vehicle seat 10. Process 200 then proceeds to an operation 213 in which seat-back position sensor 52 provides a signal indicative of seat-back position to controller 42. Process 200 then proceeds to an operation 214 in which seat back 32 is moved to the forward-most position and locked in the forward-most position. Process 200 then proceeds to an operation 215 in which seat back 32 is manually released to move freely. The manual release may be from either engagement directly of seat-back actuator 46 or through engagement of remote release button 30. Process 200 then returns to operation 213.

Process 200 proceeds to an operation 216 instead of operation 214 when seat back 32 is returned to the original arrangement. Process 200 then proceeds to an operation 217 in which seat-back actuator 46 is locked blocking additional rotation of seat back 32 relative to seat bottom 40. Process 200 then proceeds to an operation 218 in which controller 42 commands longitudinal lock actuator 44 to release allowing vehicle seat 10 to move freely along the longitudinal path. Process 200 then proceeds to an operation 219 in which position-sensor unit 36 provides the longitudinal position to the controller 42. Process 200 then proceeds to an operation 220 in which controller 42 commands longitudinal lock actuator 44 to lock when vehicle seat 10 is back at the original longitudinal position.

Turning to FIG. 29, an illustrative embodiment of a seat position sensing system 600 in accordance with the present disclosure is shown. In some illustrative embodiments, seat position sensing system 600 may calculate a recline angle for a seat back relative to a vehicle floor, and in illustrative embodiments moves or facilitates manual adjustment of the seat back to a previously calculated, occupant-preferred recline angle in response to occupant instructions. In some illustrative embodiments, seat position sensing system 600 also calculates a recline angle for a seat back relative to a vehicle floor, and in addition calculates a longitudinal position of the vehicle seat relative to the vehicle floor. Seat position sensing system 600 may further move or facilitate manual adjustment of the seat back to a previously calculated, occupant-preferred recline angle and moves or facilitates manual adjustment of the seat to a previously calculated, occupant-preferred longitudinal position in response to occupant instructions.

Seat position sensing system 600 is used, for example, in a vehicle in connection with a vehicle seat (e.g., such as those disclosed in any of FIGS. 1, 11, 25, and 21) having a seat bottom 625 and a seat back 630. Seat bottom 625 includes a seat foundation 627 anchored to a vehicle floor 635. Seat back 630 extends upwardly from seat bottom 625 and is rotationally movable in relation to seat bottom 625 about pivot axis 695 through either powered or manual mechanisms, as described herein. Variable angles of orientation exist among seat back 630, seat bottom 625, vehicle floor 635, and a reference plane 640. Reference plane 640 provides a measurement reference for variable angles of orientation to be discussed herein, and is established such that a gravity vector (g) extends normal to reference plane 640 as shown in FIG. 29.

Seat position sensing system 600 includes a seat-orientation unit 605 and a seat-motion controller 610. Seat-orientation unit 605 senses orientations of seat back 630 and vehicle floor 635 relative to gravity and communicates these orientations to seat-motion controller 610. Seat-motion controller 610 calculates a vehicle incline angle, an actual seat back recline angle, and an adjusted seat back recline angle relative to the vehicle incline angle. By calculating an adjusted seat back recline angle relative to the vehicle incline angle, seat position sensing system 600 can sense and store a recline angle of seat back 630 in a manner that controls for uneven terrain on which vehicle 643 may drive, such as inclined hills. This allows seat position sensing system 600 to store occupant-preferred recline angles for seat back 630, and to later move or facilitate manual adjustment of seat back 630 to occupant-preferred recline angles, regardless of the terrain on which vehicle 643 is positioned. Seat-orientation unit 605 includes a vehicle orientation sensor 609 and a seat-back sensor 607. Vehicle orientation sensor 609 is configured to sense an orientation of vehicle 643, and in particular vehicle floor 635, relative to gravity. Seat-back sensor 607 is configured to sense an orientation of seat back 630, and in particular a recline angle of seat back 630, relative to gravity.

To sense an orientation of vehicle floor 635 relative to gravity, vehicle orientation sensor 609 includes an accelerometer measuring and outputting accelerations ($\alpha_x$), ($\alpha_y$), and ($\alpha_z$) relative to gravity along three directional axes x, y, and z, as suggested in FIG. 29. Vehicle orientation sensor 609 communicates accelerations ($\alpha_x$), ($\alpha_y$), and ($\alpha_z$) to seat-motion controller 610, which calculates a vehicle incline angle ($\theta_A$). Vehicle incline angle ($\theta_A$) represents a variable angle between reference plane 640 and vehicle floor 635. Thus, ($\theta_A$) may take on smaller values when vehicle 643 is on flat terrain and may take on larger values when vehicle 643 is driving up a hill having a high grade. Accelerations ($\alpha_x$), ($\alpha_y$), and ($\alpha_z$) may be encoded digitally and transmitted with any suitable resolution, and illustratively may be transmitted with 10 bit, or other suitable resolution. Vehicle orientation sensor 609 may discard a certain number of least significant bits, such as the two least significant bits, to suppress noise.

To sense a recline angle of seat back 630 relative to gravity, seat-back sensor 607 includes an accelerometer measuring and outputting accelerations ($\beta_x$), ($\beta_y$), and ($\beta_z$) relative to gravity along three directional axes x, y, and z, as suggested in FIG. 29. Seat-back sensor 607 communicates accelerations ($\beta_x$), ($\beta_y$), and ($\beta_z$) to seat-motion controller 610, which calculates an actual seat back recline angle ($\theta_B$). Actual seat back recline angle ($\theta_B$) represents a variable angle between seat back 630 and reference plane 640. Thus, ($\theta_B$) may take on larger values in situations where seat back 630 is reclined backward, and may also take on larger values when vehicle 643 is positioned on a hill having a high grade. Accelerations ($\beta_x$), ($\beta_y$), and ($\beta_z$) may be encoded digitally and transmitted with any suitable resolution, and illustratively may be transmitted with 10 bit resolution. Seat-back sensor 607 may discard a certain number of least significant bits, such as the two least significant bits, to suppress noise.

Seat-motion controller 610 then subtracts vehicle incline angle ($\theta_A$) from actual seat back recline angle ($\theta_B$) to calculate an adjusted seat back recline angle ($\theta_C$). Adjusted seat back recline angle ($\theta_C$) represents a variable angle between seat back 630 and vehicle floor 635, as suggested in FIG. 29. As a result, adjusted seat back recline angle ($\theta_C$) measures the seat back recline angle, controlling for any uneven terrain that vehicle 643 may be driving on, such as an inclined hill. Adjusted seat back recline angle ($\theta_C$) will take on larger values in situations where seat back 630 reclines backward, but will generally not change when vehicle 643 moves from flat terrain to inclined terrain and vice versa.

By calculating adjusted seat back recline angle ($\theta_C$), seat position sensing system 600 can gauge an amount of seat back recline in a manner that is independent of terrain on which vehicle 643 is driving. This is beneficial because the terrain may vary from one moment to the next, causing variations in the angular orientation of vehicle 643. A vehicle occupant, however, will generally seek a comfortable seat orientation relative to vehicle 643 regardless of angular orientations of vehicle 643. As such, from an occupant comfort perspective, adjusted seat back recline angle ($\theta_C$) is more relevant than actual seat back recline angle ($\theta_B$).

Seat-motion controller includes a first angle calculator 650 for calculating vehicle incline angle ($\theta_A$), a second angle calculator 651 for calculating actual seat back recline angle ($\theta_B$), and a position calculator 660 for computing adjusted seat back recline angle ($\theta_C$). To calculate vehicle incline angle ($\theta_A$), first angle calculator 650 uses mathematical formulae that factor how vehicle incline angle ($\theta_A$) varies as a function of accelerations ($\alpha_x$), ($\alpha_y$), and ($\alpha_z$), each of which are measured relative to gravity. In this illustrative embodiment, the formula [arctan(($\alpha_x$)/($\alpha_z$))] is used to compute ($\theta_A$), as shown in FIG. 29. Similarly, second angle calculator 651 uses mathematical formulae that factor how actual seat back recline angle ($\theta_B$) varies as a function of accelerations ($\beta_x$), ($\beta_y$), and ($\beta_z$), each of which are measured relative to gravity. In this illustrative embodiment, the formula [90°+arctan(($\beta_x$)/($\beta_z$))] is used to compute ($\theta_B$).

Position calculator 660 computes adjusted seat back recline angle ($\theta_C$) as a difference between actual seat back recline angle ($\theta_B$) and vehicle incline angle ($\theta_A$)—i.e., [($\theta_B$)−($\theta_A$)]. This is because, as explained, adjusted seat back recline angle ($\theta_C$) represents a recline angle of the seat back 630 relative to an incline angle of the vehicle, which enables the seat position sensing system 600 to control for inclines on which the vehicle may be driving.

Another embodiment of a seat position sensing system 700 is illustrated in FIG. 30. Seat position sensing system 700 enables the functionality of seat position sensing system 600, and additionally calculates and stores a preferred longitudinal position of vehicle seat 620. Thus, similar to seat position sensing system 600, seat position sensing system 700 calculates an adjusted seat back recline angle ($\theta_C$) for seat back 630 relative to vehicle floor 635. Additionally, seat position sensing system 700 calculates a longitudinal position (d) of vehicle seat 620, including seat bottom 625, relative to vehicle floor 635. In this illustrative embodiment, longitudinal position (d) is measured from a front end 627a of seat foundation 627 to a reference point on vehicle floor 635 towards the front of the vehicle (e.g., near a gas pedal, not shown). However, other reference points can be used to measure a longitudinal position of vehicle seat 620, including any component in consistent movable relationship with vehicle seat 620 in combination with any component on or affixed to vehicle floor 635.

Seat position sensing system 700 includes a seat-orientation unit 705 and a seat-motion controller 710. Similar to seat-orientation unit 605, discussed above, seat-orientation unit 705 senses an orientation of seat back 630 and an orientation of vehicle floor 635. Seat-orientation unit 705 additionally generates outputs from a linear position sensor 702, which are used to compute longitudinal position (d) of vehicle seat bottom 625. Similar to seat-motion controller 610, discussed above, seat-motion controller 710 calculates a vehicle incline angle, an actual seat back recline angle, and an adjusted seat back recline angle relative to the vehicle incline angle. Seat-motion controller 710 additionally calculates a rotation amount ($\rho$) of linear position sensor 702, and uses rotation amount ($\rho$) to calculate a longitudinal position (d) seat bottom 625 relative to vehicle floor 635.

Seat-orientation unit 705 includes several components that correspond to like components described in connection with seat position sensing system 600. Illustratively, seat-orientation unit 705 includes vehicle orientation sensor 609 to sense an orientation of vehicle floor 635 relative to gravity by measuring and outputting accelerations ($\alpha_x$), ($\alpha_y$), and ($\alpha_z$). Seat-orientation unit 705 also includes seat-back sensor 607 configured to sense an orientation of seat back 630 relative to gravity by measuring and outputting accelerations ($\beta_x$), ($\beta_y$), and ($\beta_z$).

Likewise, seat-motion controller 710 includes several components that correspond with components described in connection with seat position sensing system 600. Thus, seat-motion controller 710 includes first angle calculator 650 for calculating vehicle incline angle ($\theta_A$), second angle calculator 651 for calculating actual seat back recline angle ($\theta_B$), and position calculator 660 for computing adjusted seat back recline angle ($\theta_C$). Seat-motion controller 710 also includes memory 665 for storing preferred seat back recline angle ($\theta_C$(pref)), occupant input 670 for receiving occupant inputs, memory recall 675 for retrieving preferred seat back recline angle ($\theta_C$(pref)), and mover controller 680 and seat-back actuator 685 for either powered rotation or to facilitate manual adjustment of seat back 630.

Seat-orientation unit 705 additionally includes linear position sensor 702. Outputs from linear position sensor 702 are used by seat-motion controller 710 to compute longitudinal position (d) of seat bottom 625. To generate outputs from which longitudinal position (d) can be calculated, linear position sensor 702 may include an accelerometer that rotates as seat bottom 625 is moved. The accelerometer may generate outputs that vary based on rotation amount ($\rho$) of the accelerometer. Based on the outputs of the accelerometer, seat-motion controller 710 computes rotation amount ($\rho$), as shown in FIG. 30. Position calculator 660 then converts rotation amount ($\rho$) to longitudinal position (d) based on predetermined mathematical formulae.

It will be understood that the term algorithm or module as used herein does not limit the functionality to particular physical modules, but may include any number of tangible software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

An exemplary vehicle system 3101 comprises various vehicle electronics subsystems and/or components including any of the sensor configurations discussed above as suggested in FIG. 31. Engine/transmission module 3102 is configured to process and provide vehicle engine and transmission characteristic or parameter data, and may comprise an engine control unit (ECU) and a transmission control. A global positioning system (GPS) module 3103 provides location data for vehicle 3101. Sensors 3104 provides sensor data which may comprise data relating to any of the seat sensors described above, and may also comprise data relating to any vehicle characteristic and/or parameter data (e.g., from 3102), and may also provide environmental data pertaining to the vehicle, its interior and/or surroundings, such as temperature, humidity and the like. Vehicle system 3101 may be configured to transmit or receive data for seat sensors 3104 in conjunction with certain detections made from vehicle sensors 3104. For example, vehicle system 3101 may be configured to automatically transmit (e.g., via 3106) past and/or present seat positioning data from seat sensors 1104, or may receive seat positioning data for automatically setting a seat position.

Radio/entertainment module 105 may provide data relating to audio/video media being played in vehicle 3101. Module 3105 may be integrated and/or communicatively coupled to an entertainment unit configured to play AM/FM radio, satellite radio, compact disks, DVDs, digital media, streaming media and the like. Communications module 3106 allows any of the modules in FIG. 31 to communicate with each other and/or external devices via a wired connection or wireless protocol, such as Wi-Fi, Bluetooth, NFC, etc. In one embodiment, modules 3102-3106 may be communicatively coupled to bus 112 for certain communication and data exchange purposes.

Vehicle 3101 may further comprise a main processor 3107 that centrally processes and controls data communication throughout the system of FIG. 1. Main processor 3107 may be embodied as an automotive computer or may be part of a processing system that provides and/or assists in performing any of the functions described herein. Storage 3108 may be configured to store data from any device and/or component of vehicle system 3101 including, but not limited to, software, sensor data, sensor processing algorithms, media, files, and the like. Digital signal processor (DSP) 3109 may comprise a processor separate from main processor 3107, or may be integrated within processor 3107. Generally speaking, DSP 3109 may be configured to take signals, such as sensor signals, voice, audio, video, temperature, pressure, position, etc. that have been digitized and then mathematically manipulate them as needed. Display 3110 may be configured to provide visual (as well as audio) indicial from any module in FIG. 31, and may be a configured as a LCD, LED, OLED, or any other suitable display (e.g., touch screen interactive display 24). Display 3110 may also be configured with audio speakers for providing audio output. Input/output module 3111 is configured to provide data input via key pads, touch screens, joystick controllers and the like, and outputs to/from other peripheral devices. Users (occupants) may manually enter data, such as user profile data and/or control signals for seat setting and/or responding to sensors. As discussed above, modules 3107-3111 may be communicatively coupled to data bus 112 for transmitting/receiving data and information from other modules.

Turning to FIG. 32, an exemplary embodiment is illustrated, where a vehicle 3101 (see FIG. 31) is paired with one or more devices 3201 (3202, 3203) which may be registered to one or more users (occupants). Devices 3201 may comprise smart phones, health/fitness monitoring devices, tablets, laptops, and the like. In some embodiments, devices 3201 may be registered with vehicle 3101 using Bluetooth pairing or using WiFi or NFC registration, as is known in the art. In some illustrative embodiments, device 3201 registrations are stored (e.g., 3108) at the vehicle according to a device ID or SIM ID, and may further include a device user profile (occupant profile data) associated with each ID that may include seat position preferences, seat range preferences, demographic data, health data, including age, gender, height, weight, previous sensor reading data, user interests, and/or user sensor/device/vehicle history. In the embodiment of FIG. 32, devices 3202, 3203 are configured to receive vehicle/seat characteristic and/or parameter from vehicle 3101, and are further configured to communicate with each other. Portable devices 3201 are also configured to communicate with wireless network 3204 in order to send/receive data from a central server 3205. Similarly, in one embodiment, vehicle 3101 may also be configured to communicate with network 3204. Server 3205 may be also configured to perform back-end processing for data sent from devices 3201 and vehicle 3101, and further communicate with other remote servers for additional functionalities, such as software applications, media servers, social media, and the like.

In some illustrative embodiments, sensor data and/or processed data from any of the sensors may be transmitted from vehicle 3101 to server 3205, which may be a stand-alone server, or part of a server group or cloud. Server 3205 may also collect data including sensor data and/or processed sensor data from other vehicles similarly equipped as vehicle 3101. Server 3205 may be further configured to process other vehicle sensor data (e.g., speed, acceleration, braking, etc.) and other vehicle characteristic data (e.g., seating position, activation of entertainment system, etc.) and location data (e.g., GPS coordinates) and combine such data to create vehicle and/or location profiles for use in seating feature adjustment.

The following numbered clauses include embodiments that are contemplated and non-limiting:

Clause 1. A vehicle seat motion system with a manual-memory system, the vehicle seat motion system comprising a vehicle seat including a seat bottom and a seat back coupled to the seat bottom, the vehicle seat being adapted to extend upwardly away from a vehicle floor to a plurality of vertical positions, the vehicle seat being adapted to slide back and forth along the vehicle floor to a plurality of longitudinal locations, a remote interface unit, a sensor unit coupled to the vehicle seat to sense an arrangement of the vehicle seat relative to the vehicle floor, an actuator unit coupled to the vehicle seat to cause the vehicle seat to move vertically toward or away from the vehicle floor and longitudinally along the vehicle floor, and a manual-memory system comprising a controller configured to provide means for a multitude of adjustments of a longitudinal position of the vehicle seat relative to a vehicle floor and storage of those longitudinal positions for recall at a later time.

Clause 2. A vehicle seat motion system with an easy-entry system, the vehicle seat motion system comprising a vehicle seat including a seat bottom and a seat back coupled to the seat bottom, the vehicle seat being adapted to extend upwardly away from a vehicle floor to a plurality of vertical positions, the vehicle seat being adapted to slide back and forth along the vehicle floor to a plurality of longitudinal locations, a remote interface unit, a sensor unit coupled to the vehicle seat to sense an arrangement of the vehicle seat relative to the vehicle floor, an actuator unit coupled to the vehicle seat to cause the vehicle seat to move vertically toward or away from the vehicle floor and longitudinally along the vehicle floor, and an easy-entry system comprising a controller configured to provide means for moving the vehicle seat between a predetermined entry arrangement and at least one previously stored vehicle seat position.

Clause 3. The vehicle seat motion system of any other clause or combination of clauses, wherein the controller is coupled to the remote interface unit to send and receive information, the controller is coupled to the sensor unit to receive sensor data from the vehicle seat, the controller is coupled to the actuator unit, and, based on the information received from the remote interface unit, the controller causes the actuator unit to actuate and move the vehicle seat.

Clause 4. The vehicle seat motion system of any other clause or combination of clauses, wherein the actuator unit includes a longitudinal lock unit coupled to the controller and adapted to move between an engaged position in which longitudinal movement of the vehicle seat is blocked and a disengaged position in which longitudinal movement of the vehicle seat is allowed.

Clause 5. The vehicle seat motion system of any other clause or combination of clauses, wherein the remote interface unit is a release button included in the vehicle seat and coupled to the controller.

Clause 6. The vehicle seat motion system of any other clause or combination of clauses, wherein the vehicle seat moves to a forward-most position for easy-entry in response to a signal from the release button and an applied force to the seat back of the vehicle seat.

Clause 7. The vehicle seat motion system of any other clause or combination of clauses, wherein the vehicle seat returns to a rearward-position after the controller receives a second signal from the release button.

The invention claimed is:

1. A vehicle seat motion system comprising:
a vehicle seat including a seat bottom and a seat back coupled to the seat bottom, the vehicle seat being adapted to extend upwardly away from a vehicle floor to a plurality of vertical positions, the vehicle seat being adapted to slide back and forth along the vehicle floor to a plurality of longitudinal locations, a remote interface unit, a sensor unit coupled to the vehicle seat to sense an arrangement of the vehicle seat relative to the vehicle floor, an actuator unit coupled to the vehicle seat to cause the vehicle seat to move vertically toward or away from the vehicle floor and longitudinally along the vehicle floor, and a controller configured to provide means for causing the actuator unit to move the vehicle seat relative to the vehicle floor in response to receipt of a signal from the remote interface unit and to cause the vehicle seat to assume a predetermined vertical position relative to the vehicle floor which corresponds to a longitudinal location of the vehicle seat sensed by the sensor unit so that passenger safety and comfort is maximized, wherein the remote interface unit displays a curve illustrating a fit approximation for the vehicle seat.

2. The vehicle seat motion system of claim 1, wherein the actuator unit includes a seat-height input plate coupled to the seat bottom to pivot relative to the seat bottom.

3. The vehicle seat motion system of claim 2, wherein the actuator unit further includes a seat-height support link arranged to extend between and interconnect a seat-bottom foundation, the seat bottom, and the seat-height input plate.

4. The vehicle seat motion system of claim 3, wherein the seat-height support link is constrained to pivot on a first end at the seat-bottom foundation and is constrained to pivot at an opposite second end by the seat-height input plate and the seat bottom.

5. The vehicle seat motion system of claim 2, wherein the actuator unit further includes a seat-height actuator adapted to engage and move the seat-height input plate so that as the seat-height actuator actuates, a vertical position of the vehicle seat changes.

6. The vehicle seat motion system of claim 1, wherein the signal includes either a vertical position or a longitudinal position, and the controller, based on the signal, adjusts the vehicle seat to a predetermined vertical position and predetermined the corresponding horizontal position using an equation, chart, or table.

7. The vehicle seat motion system of claim 6, wherein the predetermined vertical position and the predetermined horizontal position are based on demographic data.

8. The vehicle seat motion system of claim 1, wherein the curve is passenger-specific.

9. The vehicle seat motion system of claim 1, wherein the curve is configured so that a vertical position of the vehicle seat is maximized when the vehicle seat is at a forward-most longitudinal location.

10. The vehicle seat motion system of claim 1, wherein the curve is configured so that a vertical position of the vehicle seat is minimized when the vehicle seat is at a rearward-most longitudinal location.

11. The vehicle seat motion system of claim 1, wherein the predetermined vertical position is greater when the vehicle seat is in a forward position than when the predetermined vertical position of the vehicle seat is in a rearward position over a majority of the plurality of longitudinal locations.

12. The vehicle seat motion system of claim 11, wherein the vertical position of the seat in a forward-most longitudinal location is greater than the vertical position of a rearward-most longitudinal location over a majority of the plurality of longitudinal locations.

13. A vehicle seat motion system comprising:

a vehicle seat including a seat bottom and a seat back coupled to the seat bottom, the vehicle seat being adapted to extend upwardly away from a vehicle floor to a plurality of vertical positions, the vehicle seat being adapted to slide back and forth along the vehicle floor to a plurality of longitudinal locations, a remote interface unit, a sensor unit coupled to the vehicle seat to sense an arrangement of the vehicle seat relative to the vehicle floor, an actuator unit comprising
  a longitudinal actuator coupled to the vehicle seat and adapted to vary a longitudinal position of the vehicle seat relative to the vehicle floor,
  an angular actuator coupled to the seat back and adapted to vary an angular position of the seat back relative to the seat bottom, and
  a seat-height actuator coupled to the vehicle seat and adapted to vary a vertical position of the vehicle seat relative to the vehicle floor, and a controller configured to provide means for causing the actuator unit to move the vehicle seat relative to the vehicle floor in response to receipt of a signal from the remote interface unit and to cause the vehicle seat to assume a predetermined vertical position relative to the vehicle floor which corresponds to a longitudinal location of the vehicle seat sensed by the sensor unit so that passenger safety and comfort is maximized wherein the sensor unit is coupled to the controller and configured to sense the longitudinal position of the vehicle seat relative to the vehicle floor, the vertical position of the vehicle seat relative to the vehicle floor, and the angular position of the seat back relative to the seat bottom, and wherein the remote interface unit displays a curve illustrating a fit approximation for the vehicle seat.

14. A vehicle seat motion system comprising:

a vehicle seat including a seat bottom and a seat back coupled to the seat bottom, the vehicle seat being adapted to extend upwardly away from a vehicle floor to a plurality of vertical positions, the vehicle seat being adapted to slide back and forth along the vehicle floor to a plurality of longitudinal locations, a remote interface unit, a sensor unit coupled to the vehicle seat to sense an arrangement of the vehicle seat relative to the vehicle floor, an actuator unit coupled to the vehicle seat to cause the vehicle seat to move vertically toward or away from the vehicle floor and longitudinally along the vehicle floor, wherein the actuator unit includes a longitudinal lock unit configured to block selectively movement of the vehicle seat relative to the vehicle floor along a longitudinal path at any position along the longitudinal path, and a controller configured to provide means for causing the actuator unit to move the vehicle seat relative to the vehicle floor in response to receipt of a signal from the remote interface unit and to cause the vehicle seat to assume a predetermined vertical position relative to the vehicle floor which corresponds to a longitudinal location of the vehicle seat sensed by the sensor unit so that passenger safety and comfort is maximized.

15. The vehicle seat motion system of claim 14, wherein the actuator unit includes a longitudinal lock actuator configured to engage the longitudinal lock unit to cause the longitudinal lock unit to move from a locked position in which movement of the vehicle seat is blocked to an unlocked position in which movement of the vehicle seat is permitted.

16. The vehicle seat motion system of claim 15, further comprising a seat back actuator configured to provide means for releasing the seat back from a locked position.

17. The vehicle seat motion system of claim 16, wherein the controller is configured to provide means for calculating a recline angle for a seat back relative to the vehicle floor.

18. The vehicle seat motion system of claim 14, further comprising a seat orientation unit that senses orientation of the seat back and the vehicle floor relative to gravity and communicates these orientations to a seat-motion controller, wherein the seat-motion controller calculates a vehicle incline angle, an actual seat back recline angle, and an adjusted seat back recline angle relative to the vehicle incline angle.

19. The vehicle seat motion system of claim 18, wherein the seat orientation unit further calculates a longitudinal position of the seat bottom.

\* \* \* \* \*